(12) United States Patent
Kim et al.

(10) Patent No.: US 8,316,401 B2
(45) Date of Patent: Nov. 20, 2012

(54) METHOD FOR PROCESSING BROADCAST PROGRAM INFORMATION AND BROADCAST RECEIVER

(75) Inventors: Kwan Suk Kim, Seoul (KR); Hyeon Jae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 12/771,047

(22) Filed: Apr. 30, 2010

(65) Prior Publication Data

US 2011/0099579 A1 Apr. 28, 2011

Related U.S. Application Data

(60) Provisional application No. 61/254,742, filed on Oct. 25, 2009.

(51) Int. Cl.
*H04N 7/20* (2006.01)

(52) U.S. Cl. ............... 725/70; 725/32; 725/44; 725/45; 725/46; 725/47; 725/50; 725/52; 725/54; 725/61; 725/67; 725/68; 725/71

(58) Field of Classification Search .............. 725/32, 725/44–47, 50, 52, 54, 61, 67–68, 70–71
See application file for complete search history.

(56) References Cited

U.S. PATENT DOCUMENTS

| 6,005,562 | A | * | 12/1999 | Shiga et al. ................ 715/721 |
|---|---|---|---|---|
| 2001/0004908 | A1 | * | 6/2001 | Takahashi et al. ............ 141/9 |
| 2003/0208763 | A1 | * | 11/2003 | McElhatten et al. .......... 725/58 |
| 2004/0016003 | A1 | * | 1/2004 | Lee .............................. 725/153 |
| 2004/0237108 | A1 | * | 11/2004 | Drazin et al. ................ 725/56 |
| 2005/0235316 | A1 | * | 10/2005 | Ahmad-Taylor ............. 725/44 |
| 2005/0240963 | A1 | * | 10/2005 | Preisman et al. ............. 725/44 |
| 2006/0206819 | A1 | * | 9/2006 | Tsuji et al. ................... 715/716 |
| 2007/0143812 | A1 | * | 6/2007 | Choi ............................ 725/132 |
| 2007/0277208 | A1 | * | 11/2007 | Asbun et al. ................. 725/110 |

FOREIGN PATENT DOCUMENTS

| JP | 2009-33618 A | 2/2009 |
|---|---|---|
| KR | 10-2006-0091575 A | 8/2006 |
| KR | 10-2008-0039520 A | 5/2008 |

OTHER PUBLICATIONS

PCT International Search Report dated Nov. 10, 2010 issued in Application No. PCT/KR2010/002108.

\* cited by examiner

*Primary Examiner* — Jason Salce
(74) *Attorney, Agent, or Firm* — KED & Associates, LLP

(57) ABSTRACT

A method for processing program information and a broadcast receiver are disclosed. The method includes selecting a program from a service guide screen, identifying a group to which the selected program belongs, and displaying a group list of programs included in a signaling table that signals information of the identified group.

18 Claims, 31 Drawing Sheets

| Syntax | No. of Bits | Format |
|---|---|---|
| event_group_table_section() { | | |
|   table_id | 8 | 0xe9 |
|   section_syntax_indicator | 1 | '1' |
|   private_indicator | 1 | '1' |
|   reserved | 2 | '11' |
|   section_length | 12 | uimsbf |
|   event_group_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   group_title_length | 8 | uimsbf |
|   group_title_text() | var | |
|   super_group | 1 | |
|   reserved | 7 | '1111111' |
|   num_events_in_section | 8 | uimsbf |
|   for (j=0; j< num_events_in_section; j++) { | | |
|     title_length | 8 | uimsbf |
|     title_text() | var | |
|     num_links_in_event | 8 | uimsbf |
|     for (j=0; j< num_links_in_event; j++) { | | |
|       link_type | 8 | uimsbf |
|       link_media | 8 | uimsbf |
|       link_length | 8 | |
|       link_byte | var | |
|     } | | |
|     event_descriptor_length | 8 | uimsbf |
|     event_descriptor | var | |
|   } | | |
|   group_descriptor_length | 8 | uimsbf |
|   group_descriptor | var | |
|   CRC_32 | 32 | rpchof |
| } | | |

FIG. 5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG. 6

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 7

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 8

| Syntax | No. of Bits | Format |
|---|---|---|
| data_service_table_bytes() { | | |
|     sdf_protocol_version | 8 | uimsbf |
|     application_count_in_section | 8 | uimsbf |
|     if(application_count_in_section > 0) { | | |
|         for(j = 0; j <application_count_in_section; j++) { | | |
|             compatibility_descriptor() | | |
|             app_id_byte_length | 16 | uimsbf |
|             if(app_id_byte_length > 1) { | | |
|                 app_id_description | 16 | uimsbf |
|                 for(i=0;i<app_id_byte_length-2;i++) { | | |
|                     app_id_byte | 8 | bslbf |
|                 } | | |
|             } | | |
|             tap_count | 8 | uimsbf |
|             for(i=0;i<tap_count; i++) { | | |
|                 protocol_encapsulation | 8 | uimsbf |
|                 action_type | 7 | uimsbf |
|                 resource_location | 1 | bslbf |
|                 Tap() | | |
|                 tap_info_length | 16 | uimsbf |
|                 for(k=0; k<N; k++) { | | |
|                     descriptor() | | |
|                 } | | |
|             } | | |
|             app_info_length | 16 | uimsbf |
|             for(i=0; i<M; i++) { | | |
|                 descriptor() | | |
|             } | | |
|             app_data_length | 16 | uimsbf |
|             for(i=0; i<app_data_length; i++) { | | |
|                 app_data_byte | 8 | bslbf |
|             } | | |
|         } | | |
|     } | | |
|     service_info_length | 16 | uimsbf |
|     for(j=0; j<K; j++) | | |
|         descriptor() | | |
|     } | | |
|     service_private_data_length | 16 | uimsbf |
|     for(j=0; j<service_private_data_length; j++){ | | |
|         service_private_data_byte | 8 | bslbf |
|     } | | |
| } | | |

FIG. 10

| Syntax | No.of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | '11111111' |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (i=0;i< num_NRT_services; i++) | | |
|   { | | |
|     NRT_service_id | 16 | uimsbf |
|     reserved | 2 | '11' |
|     NRT_service_status | 2 | uimsbf |
|     SP_indicator | 1 | bslbf |
|     short_NRT_service_name_length /' m '/ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |

FIG. 11

| | | |
|---|---|---|
| num_component_level_descriptors | 4 | uimsbf |
| for (k=0;k< num_components_level_descriptors; k++) | | |
| { | | |
|    component_level_descriptor() | var | |
| } | | |
| } | | |
| reserved | 4 | '1111' |
| num_NRT_service_level_descriptors | 4 | uimsbf |
| for (m=0; m<num_NRT_service_level_descriptors; m++) | | |
| { | | |
|    NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|    virtual_channel_level_descriptor() | var | |
| } | | |
| } | | |

FIG.12

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     } | | |
|     NRT_component_data(component_type) | var | |
| } | | |

FIG. 13

| Syntax | No.of Bits | Format |
|---|---|---|
| NRT_component_data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1') { | | |
|       tias_bandwidth | 16 | uimsbf |
|    } | | |
|    if (as_bandwidth_indicator == '1') { | | |
|       as_bandwidth | 16 | uimsbf |
|    } | | |
|    if (FEC_OTI_indicator == '1') { | | |
|      FEC_encoding_id | 8 | uimsbf |
|      FEC_instance_id | 16 | uimsbf |
|    } | | |
| } | | |

FIG. 14

| Syntax | No. of Bits | Format |
|---|---|---|
| NRT_information_table_section() { | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     NRT_IT_version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     time_span_start | 32 | uimsbf |
|     reserved | 5 | '11111' |
|     time_span_length | 11 | uimsbf |
|     num_items_in_section | 8 | uimsbf |
|     for (j=0; j< num_items_in_section; j++) { | | |
|         content_linkage | 32 | uimsbf |
|         updates_available | 1 | bslbf |
|         reserved | 1 | '1' |
|         TF_available | 1 | bslbf |
|         low_latency | 1 | bslbf |
|         playback_length_in_seconds | 20 | uimsbf |
|         content_length_included | 1 | bslbf |
|         playback_delay_included | 1 | bslbf |
|         expiration_included | 1 | bslbf |
|         reserved | 1 | '1' |
|         duration | 12 | uimsbf |

FIG. 15

| | | |
|---|---|---|
| if (content_length_included==1) { | | |
|     content_length | 40 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
|     content_descriptor() | | |
| } | | |
| } | | |
| reserved | 6 | '111111' |
| descriptors_length | 10 | uimsbf |
| for (i=0; i<M; i++) { | | |
|     descriptor() | | |
| } | | |
| } | | |

FIG. 17

| Syntax | Bits | Format |
|---|---|---|
| event_information_table_section () { | | |
|     table_id | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     zero | 2 | '00' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j = 0; j< num_events_in_section;j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | uimsbf |
|         for (i=0;i<N;i++) { | | |
|             descriptor() | | |
|         } | | |
|     } | | |
|     CRC_32 | 32 | rpchof |
| } | | |

FIG. 18

| Syntax | No. of Bits | Format |
|---|---|---|
| event_group_table_section() { | | |
|   table_id | 8 | 0xe9 |
|   section_syntax_indicator | 1 | '1' |
|   private_indicator | 1 | '1' |
|   reserved | 2 | '11' |
|   section_length | 12 | uimsbf |
|   event_group_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   group_title_length | 8 | uimsbf |
|   group_title_text() | var | |
|   super_group | 1 | |
|   reserved | 7 | '1111111' |
|   num_events_in_section | 8 | uimsbf |
|   for (j=0; j< num_events_in_section; j++) { | | |
|     title_length | 8 | uimsbf |
|     title_text() | var | |
|     num_links_in_event | 8 | uimsbf |
|     for (j=0; j< num_links_in_event; j++) { | | |
|       link_type | 8 | uimsbf |
|       link_media | 8 | uimsbf |
|       link_length | 8 | |
|       link_byte | var | |
|     } | | |
|     event_descriptor_length | 8 | uimsbf |
|     event_descriptor | var | |
|   } | | |
|   group_descriptor_length | 8 | uimsbf |
|   group_descriptor | var | |
|   CRC_32 | 32 | rpchof |
| } | | |

FIG. 19

| 0x0000 | Terrestrial VCT with current_next_indicator='1' |
|---|---|
| 0x0001 | Terrestrial VCT with current_next_indicator='0' |
| 0x0002 | Cable VCT with current_next_indicator='1' |
| 0x0003 | Cable VCT with current_next_indicator='0' |
| 0x0004 | Channel ETT |
| 0x0005 | DCCSCT |
| 0x0006 | Event Group Table |
| 0x0007-0x00FF | [Reserved for future ATSC use] |
| 0x0100-0x017F | EIT-0 to EIT-127 |
| 0x0180-0x01FF | [Reserved for future ATSC use] |
| 0x0200-0x027F | Event ETT-0 to event ETT-127 |
| 0x0280-0x0300 | [Reserved for future ATSC use] |
| 0x0301-0x03FF | RRT with rating_region 1-255 |
| 0x0400-0x0FFF | [User private] |
| 0x1000-0x13FF | [Reserved for future ATSC use] |
| 0x1400-0x14FF | DCCT with dcc_id 0x00 – 0xFF |
| 0x1500-0xFFFF | [Reserved for future ATSC use] |

FIG. 20

| 0x0000 | Terrestrial VCT with current_next_indicator='1' |
|---|---|
| 0x0001 | Terrestrial VCT with current_next_indicator='0' |
| 0x0002 | Cable VCT with current_next_indicator='1' |
| 0x0003 | Cable VCT with current_next_indicator='0' |
| 0x0004 | Channel ETT |
| 0x0005 | DCCSCT |
| 0x0006-0x00FF | [Reserved for future ATSC use] |
| 0x0100-0x017F | EIT-0 to EIT-127 |
| 0x0180-0x01FF | [Reserved for future ATSC use] |
| 0x0200-0x027F | Event ETT-0 to event ETT-127 |
| 0x0280-0x0300 | [Reserved for future ATSC use] |
| 0x0301-0x03FF | RRT with rating_region 1-255 |
| 0x0400-0x0FFF | [User private] |
| 0x1000-0x10FF | Event Group Table 0 to Event Group Table 255 |
| 0x1100-0x13FF | [Reserved for future ATSC use] |
| 0x1400-0x14FF | DCCT with dcc_id 0x00 – 0xFF |
| 0x1500-0xFFFF | [Reserved for future ATSC use] |

FIG. 21

|  | link_type |
|---|---|
| eventgroup | 0x00 |
| Html Portal | 0x01 |
| Thumbnail | 0x02 |
| Preview Clip | 0x03 |
| A/V | 0x04 |

FIG. 22

|  | link_media | link_byte |
|---|---|---|
| eventgroup | 0x04 | event_group_id |
| EIT event | 0x01 | ETM_id |
| Thumbnail | 0x02 | service_id, content_id |
| Preview Clip | 0x03 | URL |

FIG. 23

| Syntax | No. of Bits | Format |
|---|---|---|
| event_group_descriptor() {<br>   descriptor_tag<br>   descriptor_length<br>   event_group_id<br>} | 8<br>8<br>16 | 0xe8<br>uimsbf<br>uimsbf |

EG0 is the event group including Ev0, Ev1, Ev2
Ev0 in EG0 is related to Event0 in EIT0
Ev1 in EG0 is related to NRT service0 and Event2 in EIT1
Ev2 in EG0 can be download through the Internet

FIG. 31

| CH1 | Program1 | Program2 | Program3 | Program4 |
|---|---|---|---|---|
| CH2 | ProgramA | Heroes Season 1 [ Episode 1 ] | | ProgramB |
| CH3 | | | | |

(a)

| Heroes | | [ Season 1 ] | | | | |
|---|---|---|---|---|---|---|
| Season 1 | Heroes Episode 1 | ▶ | ■ | $ | Send | ? |
| *Season 2* | Heroes Episode 2 | ▶ | ■ | $ | Send | ? |
| | Heroes Episode 3 | ▶ | ■ | $ | Send | ? |
| | Heroes Episode 4 | ▶ | ■ | $ | Send | ? |
| | Heroes Episode 5 | ▶ | ■ | $ | Send | ? |
| | Heroes Episode 6 | ▶ | ■ | $ | Send | ? |
| | Heroes Episode 7 | ▶ | ■ | $ | Send | ? |
| | Heroes Episode 8 | ▶ | ■ | $ | Send | ? |
| | Heroes Episode 9 | ▶ | ■ | $ | Send | ? |
| | Heroes Episode 10 | ▶ | ■ | $ | Send | ? |
| | Heroes Episode 11 | ▶ | ■ | $ | Send | ? |
| | Heroes Episode 12 | ▶ | ■ | $ | Send | ? |

(b)

(a)

(b)

METHOD FOR PROCESSING BROADCAST PROGRAM INFORMATION AND BROADCAST RECEIVER

This application claims the benefit of U.S. Provisional Application No. 61/254,742, filed on Oct. 25, 2009, which is hereby incorporated by reference.

BACKGROUND OF THE INVENTION

1. The Field

The present invention relates to a method for processing information related to a broadcast program, and a broadcast receiver.

2. Description of the Related Art

A digital television (DTV) can provide not only video and audio services, which are conventional TV services, but can now also provide various other services. For example, the DTV can provide an Electronic Program Guide (EPG) or the like to the user and can simultaneously provide broadcast services received through 2 or more channels. Especially, the number of services that a reception system can provide has been significantly increased since the reception system has been equipped with a large-capacity storage device and has been connected to the Internet or data communication channels which enable bidirectional communication.

SUMMARY OF THE INVENTION

Accordingly, the present invention is directed to a method for processing broadcast program information and a broadcast receiver that substantially obviate one or more problems due to limitations and disadvantages of the related art.

An object of the present invention is to provide a method for signaling and servicing information about a broadcast program associated with another broadcast program, and a broadcast receiver.

Another object of the present invention is to provide a method for grouping one or more broadcast programs, and signaling and servicing group information, and a broadcast receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing program information in a broadcast receiver includes selecting a program from a service guide screen, identifying a group to which the selected program belongs, and displaying a group list of programs included in a signaling table that signals group information of the identified group.

If a group identifier is included in an EIT that signals scheduling information of the selected program, it may be determined that the selected program belongs to a group corresponding to the group identifier.

The group identifier may be included in a descriptor within an event loop applied to an individual event.

The signaling table that signals the group information may be an Event Group Table (EGT) and the EGT may include the same group identifier included in the EIT.

The EGT may include title information of the group.

The EGT may signal programs that belong to the group corresponding to the group identifier and each of the programs may include title information and information about at least one link.

The information about at least one link may include type information of the at least one link, path information of the at least one link, and an identifier of the at least one link.

If the path information of the at least one link indicates an EIT event, the identifier of the at least one link may be an Extended Text Message (ETM) identifier.

If the path information of the at least one link may indicate a non-real-time service, the identifier of the at least one link indicates a service identifier and a content identifier.

If the path information of the at least one link indicates a Web service, the identifier of the at least one link may be an Internet Uniform Resource Locator (URL).

Each of the programs in the group list may have at least one of attributes being viewable, reserved viewing available, reserved recording available, and non-viewable.

The signaling table may include indication information indicating whether the group information is information of an event group including one or more programs or information of a super group including one or more event groups.

If the indication information indicates a super group, a group identifier included in the signaling table may be an identifier of the super group, the signaling table may signal event groups that belong to the super group corresponding to the group identifier, and each of the event groups may include information about a title and an event group identifier.

In another aspect of the present invention, a method for processing program information in a broadcast receiver includes displaying a service guide screen on a display, selecting a program from the service guide screen, displaying schedule information for downloading a program included in a group of the selected program or additional information of the selected program in a non-real time service, and downloading the selected program or the additional information of the selected program according to the schedule information.

The additional information may include at least one of a preview of the selected program, a thumbnail of the selected program, casting/director information of the selected program, a music video of the selected program, an original sound track of the selected program, replay or next broadcasting schedules of programs included in the group of the selected program, and an advertisement.

The method may further include displaying a group list of programs included in a first signaling table that signals group information of the selected program.

The programs included in the group list may have at least one of attributes being viewable, reserved viewing available, reserved recording available, and non-viewable.

A group identifier (ID) of the first signaling table may be identical to a group identifier of a second signaling table that signals schedule information of the selected program or schedule information of the additional information.

The group of the selected program may belong to a super group.

The method may further include paying for the selected program or the additional information of the selected program before the downloading.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a bit stream syntax structure of a Virtual Channel Table (VCT) according to an exemplary embodiment of the present invention;

FIG. 6 illustrates values available for a service_type field included in the VCT illustrated in FIG. 5 and the meanings of the values according to an exemplary embodiment of the present invention;

FIG. 7 illustrates values available for a service_type field included in the VCT illustrated in FIG. 5 and the meanings of the values according to another exemplary embodiment of the present invention;

FIG. 8 illustrates a bit stream syntax structure of a Data Service Table (DST) according to an exemplary embodiment of the present invention;

FIG. 10 and FIG. 11 illustrate a bit stream syntax structure of an NRT Service Table (NST) section according to an exemplary embodiment of the present invention;

FIG. 12 illustrates a bit stream syntax structure of component_descriptors according to an exemplary embodiment of the present invention;

FIG. 13 illustrates a bit stream syntax structure of File Delivery over Unidirectional Transport (FLUTE) file deliver data using component_descriptor( ) illustrated in FIG. 12 according to an exemplary embodiment of the present invention;

FIGS. 14 and 15 illustrate a bit stream syntax structure of an NRT-Information Table (NRT-IT) section according to an exemplary embodiment of the present invention;

FIG. 17 illustrates a bit stream syntax structure of an Event Information Table (EIT) section according to an exemplary embodiment of the present invention;

FIG. 18 illustrates a bit stream syntax structure of an Event Group Table (EGT) section according to an exemplary embodiment of the present invention;

FIG. 19 illustrates values available for a table_type field and the meanings of the values according to an exemplary embodiment of the present invention;

FIG. 20 illustrates values available for a table_type field and the meanings of the values according to another exemplary embodiment of the present invention;

FIG. 21 illustrates values available for a link_type field and the meanings of the values according to an exemplary embodiment of the present invention;

FIG. 22 is a table that defines values available for a link_media field, and values of a link_byte field that are determined according to the values of the link_media field according to an exemplary embodiment of the present invention;

FIG. 23 illustrates a bit stream syntax structure of event_group_descriptor according to an exemplary embodiment of the present invention;

FIG. 31($a$) and FIG. 31($b$) illustrate an EPG screen and a UI screen that may be configured on the EPG screen according to another exemplary embodiment of the present invention;

DESCRIPTION OF THE PREFERRED EMBODIMENTS

Figure 1:
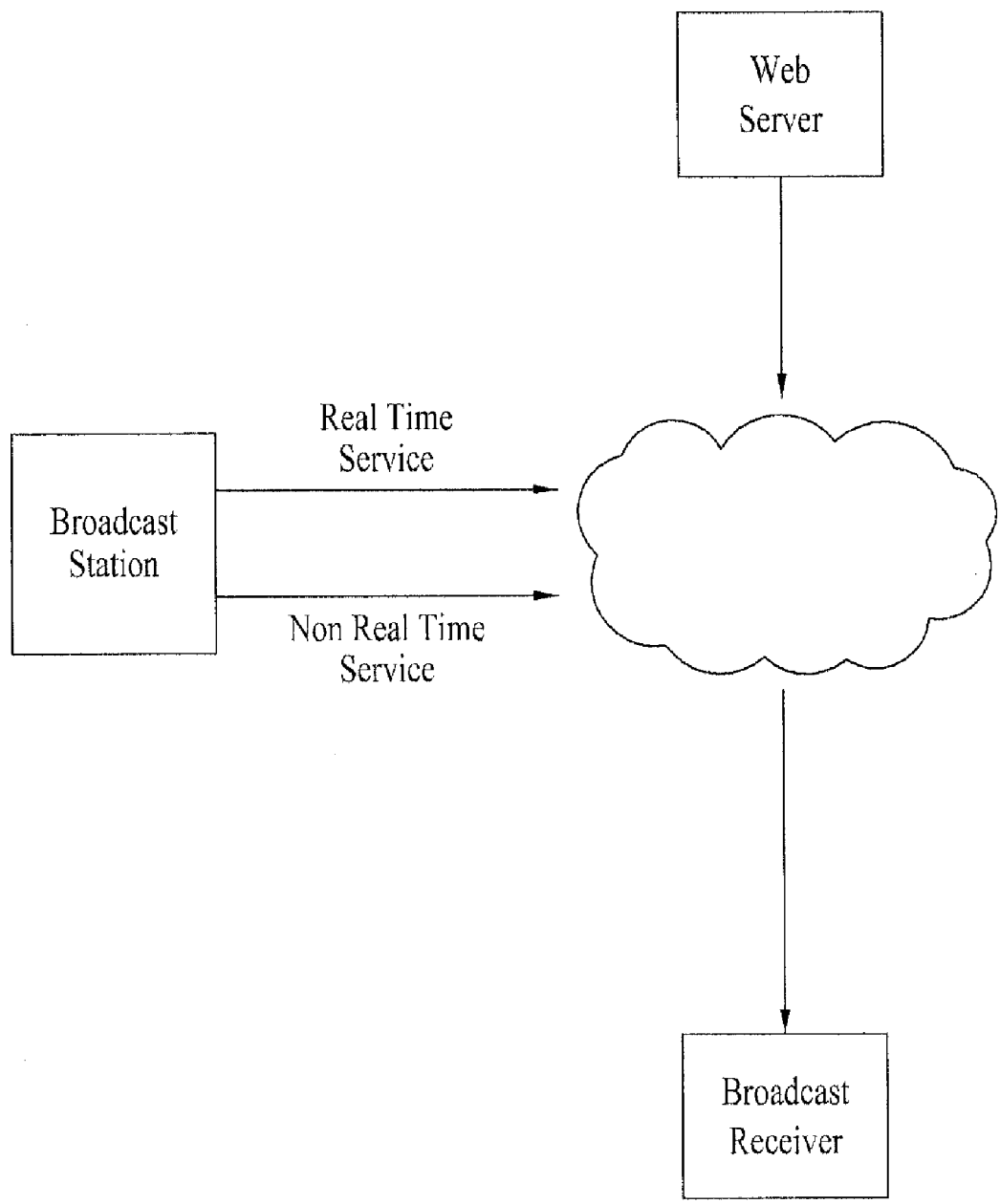
FIG. 1 illustrates a concept of a Real-Time (RT) service and a Non-Real-Time (NRT) service according to the present invention.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

In the present invention, a broadcast program may be provided by a broadcast station or a Web server. A service provided by the Web server is referred to as a Web service herein. For example, the broadcast station provides a broadcast program over a broadcasting network and the Web server provides a broadcast program over a Internet network.

To receive and decode the broadcast program, a broadcast receiver needs signaling information which is called system information or service information.

In an exemplary embodiment of the present invention, Program Specific Information/Program and System Information Protocol (PSI/PSIP) tables are used as signaling information.

The PSI is defined to classify channels and programs in compliance with a Moving Pictures Experts Group-2 (MPEG-2) standard, whereas the PSIP is defined to classify channels and programs in compliance with an Advanced Television Systems Committee (ATSC) standard.

The PSI may include a Program Association Table (PAT), a Conditional Access Table (CAT), a Program Map Table (PMT), and a Network Information Table (NIT) in an exemplary embodiment.

The PAT is special information delivered in a packet with a Packet Identifier (PID) of '0'. The PAT carries PID information about a PMT and PID information about an NIT for each program. The CAT delivers information about a paid broadcasting system used by a transmitter. The PMT carries program numbers, PIDs of transport stream packets each including individual audio and video bit streams, and the PID of a packet with a Program Clock Reference (PCR). The NIT carries information about an actual transmission network.

In an exemplary embodiment, the PSIP may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MGT provides information about the versions and PIDs of other tables except for the STT. The VCT carries information about virtual channels, for example, information about channels for use in channel selection and PIDs by which to receive audio and/or video. That is, channel names, channel numbers, and the PIDs of audio and video packets of broadcast programs played on channels may be acquired by parsing the VCT. ETTs provide detailed information about channels and programs. The RRT provides information about the ratings of video programs, allocated on a regional basis. The STT provides information about a current date and time. EITs have event information about all programs to be played on virtual channels listed in the VCT. One EIT may cover a period of three hours in its event information. Accordingly, an event of a virtual channel may be represented in a plurality of EITs.

The broadcast station may provide a broadcast program in real time or non-real time.

As is implied from its appellation, the term "Real-Time (RT) service" is a service that is provided in real time and time-constrained and the term "Non-Real-Time (NRT) service" covers services other than the RT service and is not time-constrained. Data for an NRT service is called NRT service data.

After NRT service data is stored in a storage medium of the broadcast receiver, it is displayed on a display at a predetermined time or upon request of a user. The NRT service data is received in the form of a file and stored in the storage medium in an exemplary embodiment. The storage medium is an internal Hard Disk Drive (HDD) in the broadcast receiver in an exemplary embodiment. In another exemplary embodiment, the storage medium may be a Universal Serial Bus (USB) memory or an external HDD which is connected to the broadcast reception system.

To receive and store NRT service data files and service the NRT service data files to the user, signaling information is also needed. In the present invention, signaling information for an NRT service is referred to as NRT service signaling information or NRT service signaling data. In an exemplary embodiment, the NRT service signaling information includes an NRT Service map Table or an NRT Service Table (NST) and an NRT Information Table (NRT-IT).

FIG. 1 illustrates a concept of providing an RT service and an NRT service from a broadcast station.

The broadcast station transmits an RT service in a conventional manner, that is, in the manner of current terrestrial broadcasting. The broadcast station may provide an NRT service in a remaining BandWidth (BW) from the RT service, or in a dedicated BW. In other words, the RT service and the NRT service are transmitted on the same or different channels.

Figure 2:
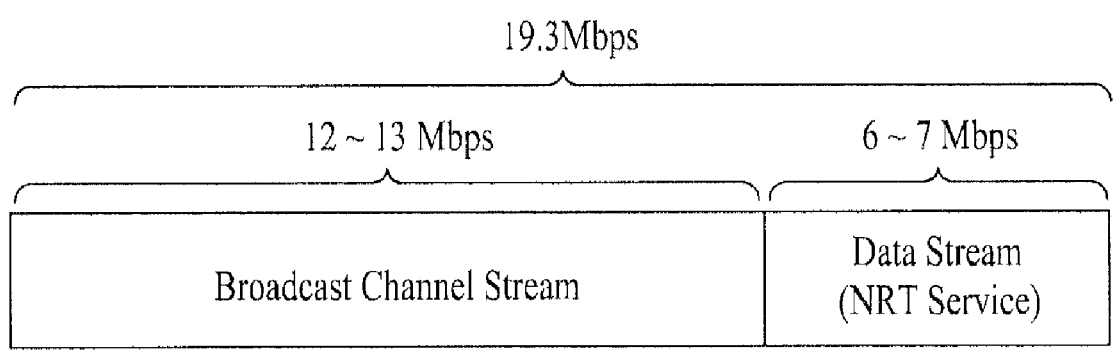
FIG. 2 illustrates transmission of an NRT service in the residual bandwidth of a channel carrying an RT service according to an exemplary embodiment of the present invention.

For example, a broadcast channel defined in ATSC standard is modulated to a 6-MHz Vestigial Side Band (VSB) method. The BW of data loaded on this modulated wave is about 19.3 Mbps. However, a High Definition (HD) broadcast stream of an RT service usually has a BW of 12 to 13 Mbps. Therefore, data other than a broadcast channel stream, such as NRT service data, is transmitted in the remainder BW (i.e. 6 to 7 Mbps) in an exemplary embodiment of the present invention, as illustrated in FIG. 2.

Therefore, a broadcast receiver can be divided into RT service and NRT service, and in order to provide the user with the NRT service when needed, NRT service signaling information (or NRT service signaling data) is required.

For example, a broadcast station can transmit a broadcast program in real time and transmit news clips, weather information, advertisements, push VOD, or the like in non-real time. The NRT service may not only provide such news clips, weather information, advertisements, and push VOD, but may also provide specific scenes and detailed information on specific program from a real-time broadcast service.

A conventional broadcast receiver (i.e., a legacy device) can receive and process RT services but cannot receive and process NRT services. Thus, it is a principle that the process of the conventional broadcast receiver (i.e., a legacy device) is not affected by NRT stream included in the transmission of RT service. In other words, the conventional broadcast receiver does not have a method of handling the NRT service even if it is received.

However, the broadcast receiver (i.e., an NRT device) according to an embodiment of the present invention can combine NRT services and RT services to provide a variety of services to the user compared to the convention receiver.

Figure 3:
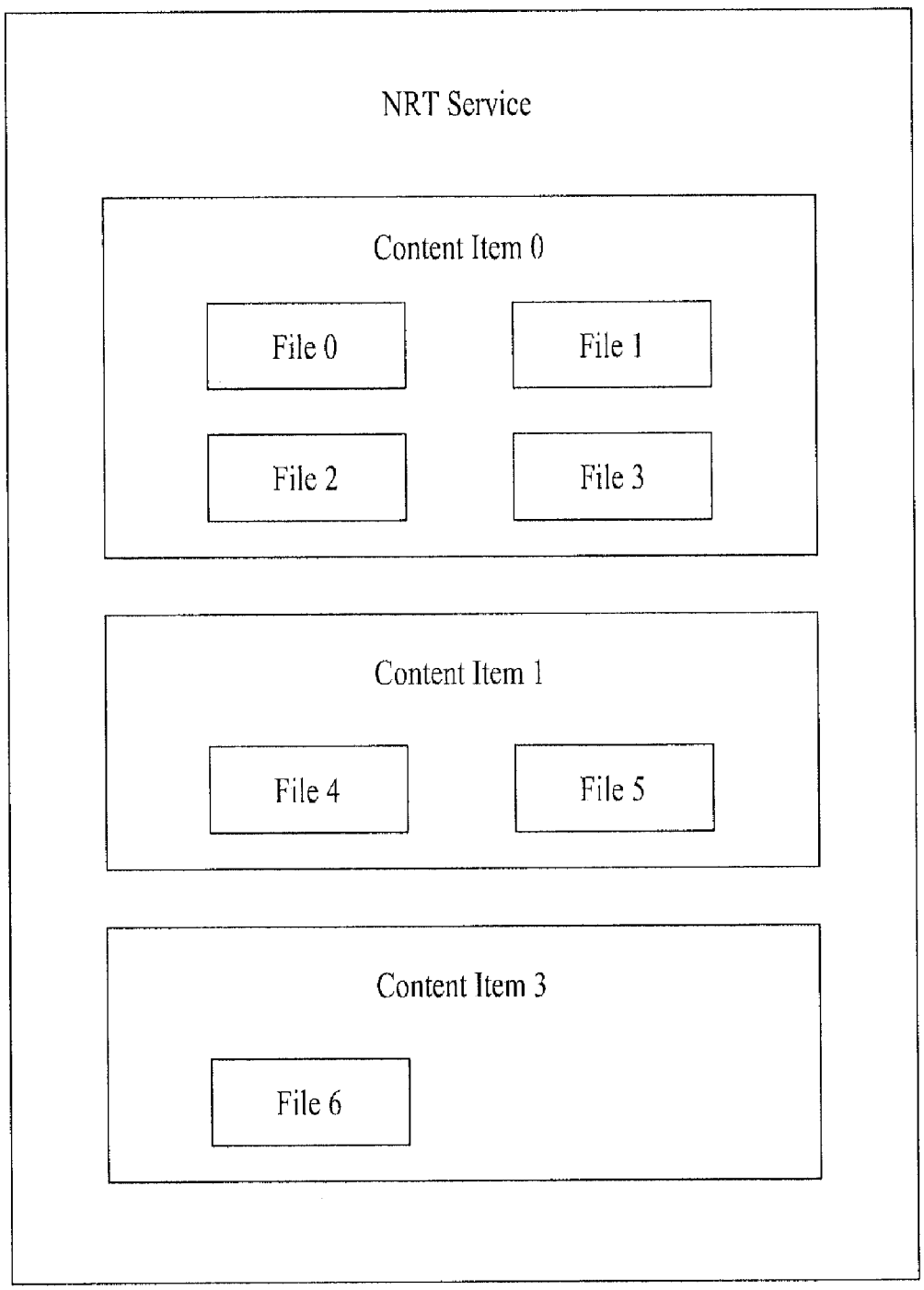
FIG. 3 illustrates a relationship among an NRT service, content items, and files according to the present invention.

In an embodiment, one NRT service according to the present invention includes one or more content item (or content or NRT content) and one content item includes one or more files as shown in FIG. 3. The terms "file" and "object" have the same meaning in the description of the present invention.

The NRT content is the minimum unit that can be presented independently. For example, when a news program, which includes an economic news section, a political news section, and a life news section, is provided in non-real time, the news program may be an NRT service and each of the economic news section, the political news section, and the life news section may be the NRT content. And each of the economic news section, the political news section, and the life news section may include at least one file.

The NRT service can be transmitted in an MPEG-2 Transport Stream (TS) packet format through a dedicated broadcast channel or the same broadcast channel as the RT service. In this case, a unique PID is transmitted after being allocated to a TS packet of the NRT service data in order to identify the NRT service. In an embodiment of the present invention, IP-based NRT service data is packetized into an MPEG-2 TS packet for transmission.

The NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet for transmission. The NRT service signaling data transmitted through an NRT service signaling channel includes NRT Service Map Table (NST) and NRT Information Table (NRT-IT). In an embodiment of the present invention, the NST provides the access information of at least one NRT service and at least one content item/file that forms NRT services that operate in the IP layer. In one embodiment of the present invention, NRT-IT provides detailed information of the content item/file that forms NRT service. In the present invention, the NST and the NRT-IT may be referred to as Signaling Information Table.

Figure 4:
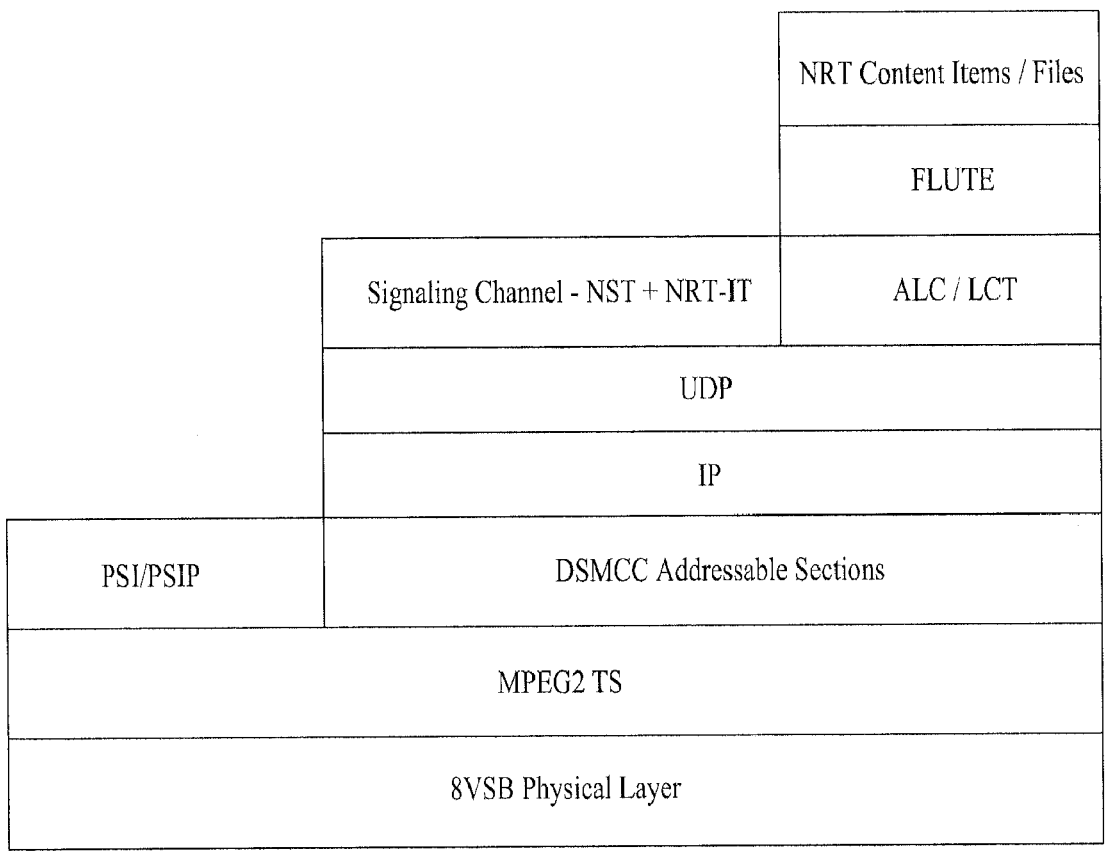
FIG. 4 illustrates a protocol stack for a fixed NRT service according to an exemplary embodiment of the present invention.

FIG. 4 illustrates a diagram for a protocol stack of an NRT service configured according to an embodiment of the present invention.

In an embodiment of the present invention, the file-type NRT service is packetized according to an IP scheme in the IP layer and then transmitted through a specific virtual channel in an MPEG-2 TS format.

In an embodiment of the present invention, as an example of the Program Specific Information/Program and System Information Protocol (PSI/PSIP) table, the presence of the NRT service may be signaled through the virtual channel in the Virtual Channel Table (VCT).

In an embodiment of the present invention, the NRT service signaling channel that transmits the NST and the NRT-IT is transmitted in an MPEG-2 TS format after being packetized according to an IP stream in the IP layer.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 4. The packetized ALC/LCT data is again packetized according to a UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation.

In addition, NRT service signaling information (or NRT service signaling data) required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, multicast of the NRT service signaling channel is achieved after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. So, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section." A 188-byte MPEG-2 TS packet can be created by dividing the addressable section data into 184-byte units and adding a 4-byte MPEG header to each 184-byte unit. At this time, a value allocated to a PID of the MPEG header is a unique value that can identify TS packets that carry the NRT service signaling channel and the NRT service.

More specifically, the PSI/PSIP table data is also packetized into MPEG-2 TS packets.

The MPEG-2 TS packets are modulated according to a predetermined transmission scheme, for example, a VSB transmission scheme, in a physical layer and are then transmitted to the reception system.

In an embodiment of the present invention, the transmission of an NRT service is determined by signaling through a PSI/PSIP table. For example, whether or not an NRT service is transmitted is signaled in a Virtual Channel Table (VCT).

FIG. 5 illustrates a VCT section syntax structure according to an embodiment of the present invention.

The VCT section transmits information on virtual channels, such as channel information for selecting channels and information such as packet identification (PID) numbers for receiving the audio and/or video data. More specifically, when the VCT section is parsed, the PID of the audio/video data of the broadcast program may be known. Herein, the corresponding audio/video data are transmitted within the channel along with the channel name and the channel number.

The VCT section syntax is configured by including at least one of a table_id field, a section_syntax_indicator field, a private_indicator field, a section_length field, a transport_stream_id field, a version_number field, a current_next_indicator field, a section_number field, a last_section_number field, a protocol_version field, and a num_channels_in_section field.

The VCT section syntax further includes a first 'for' loop (i.e., virtual channel loop) repetition statement that is repeated as much as the num_channels_in_section field value. The first repetition statement may include at least one of a short_name field, a major_channel_number field, a minor_channel_number field, a modulation_mode field, a carrier_frequency field, a channel_TSID field, a program_number field, an ETM_location field, an access_controlled field, a hidden field, a service_type field, a source_id field, a descriptor_length field, and a second 'for' loop statement that is repeated as much as the number of descriptors included in the first repetition statement. Herein, the second repetition statement will be referred to as a first descriptor loop for simplicity. The descriptor descriptors( ) included in the first descriptor loop is separately applied to each virtual channel.

Furthermore, the VCT section syntax may further include an additional_descriptor_length field, and a third 'for' loop statement that is repeated as much as the number of descriptors additionally added to the VCT. For simplicity of the description of the present invention, the third repetition statement will be referred to as a second descriptor loop. The descriptor additional_descriptors( ) included in the second descriptor loop is commonly applied to all virtual channels described in the VCT.

As described above, referring to FIG. 5, the table_id field indicates a unique identifier (or identification) (ID) that can identify the information being transmitted to the table as the VCT. More specifically, the table_id field indicates a value informing that the table corresponding to this section is a VCT. For example, a 0xC8 value may be given to the table_id field.

The version_number field indicates the version number of the VCT. The section_number field indicates the number of this section. The last_section_number field indicates the number of the last section of a complete VCT. And, the num_channel_in_section field designates the number of the overall virtual channel existing within the VCT section.

Furthermore, in the first 'for' loop repetition statement, the short_name field indicates the name of a virtual channel. The major_channel_number field indicates a 'major' channel number associated with the virtual channel defined within the first repetition statement, and the minor_channel_number field indicates a 'minor' channel number. More specifically, each of the channel numbers should be connected to the major and minor channel numbers, and the major and minor channel numbers are used as user reference numbers for the corresponding virtual channel.

The program_number field is shown for connecting the virtual channel having an MPEG-2 program association table (PAT) and program map table (PMT) defined therein, and the program_number field matches the program number within the PAT/PMT. Herein, the PAT describes the elements of a program corresponding to each program number, and the PAT indicates the PID of a transport packet transmitting the PMT. The PMT described subordinate information, and a PID list of the transport packet through which a program identification number and a separate bit sequence, such as video and/or audio data configuring the program, are being transmitted.

The service_type field indicates a service type within a corresponding virtual channel.

In an embodiment, the virtual channel may include at least one RT service and at least one NRT service including audio and/or video.

In this case, service type values may be allocated as shown in FIG. 6 and a value of 0x04 representing an ATSC-data-only service may be used to indicate that an NRT service is provided through the virtual channel.

In another embodiment, the virtual channel may include only at least one NRT service. In this case, as shown in FIG. 7, a new service_type field value of 0x08 may be defined to indicate that an NRT service is provided through the virtual channel.

The source_id field indicates a program source connected to the corresponding virtual channel.

Herein, the term "source" refers to a specific source such as a video, text, data, or audio source. The source_id field has a unique value in a transport stream in which a VCT is transmitted.

Meanwhile, data service table (DST) can be received through the PID included in the service_location_descriptor of the VCT. The type of the application and details of a data broadcast stream transmitted through this channel can be determined through the DST. In the present invention, an NRT application (i.e., an NRT service) is identified using the DST.

FIG. 8 is a diagram for a bit-stream syntax of a DST section to identity an NRT application configured according to one embodiment of the present invention.

An sdf_protocol_version field (8-bit) shall be used to specify the version of the Service Description Framework (SDF) protocol.

An application_count_in_section field (8-bit) shall specify the number of applications listed in the DST section.

A compatibility_descriptor( ) field shall contain a DSM-CC compatibility descriptor. Its purpose shall be to signal compatibility requirements of the application so that the receiving platform can determine its ability to use this data service.

An app_id_byte_length field (16-bit) shall specify the number of bytes used to identify the application.

An app_id_description field (16-bit) shall specify the format and semantics of the following application identification bytes (i.e., add_id_byte field). In this case, if a value of the app_id_description field is set to '0x0003', the receiver is aware that the application is an NRT application.

An app_id_byte field (8-bit) shall represent a byte of the application identifier.

A tap_count field (8-bit) shall specify the number of Tap( ) structures used by this application.

A protocol_encapsulation field (8-bit) shall specify the type of protocol encapsulation used to transmit the particular data element referred to by the Tap( ).

An action_type field (7-bit) shall be used to indicate the nature of the data referred to by the Tap( ).

A resource_location field (1-bit) shall specify the location of the Association Tag field matched with the association_tag value listed in the following Tap structure. This bit shall be set to '0' when the matching association_tag resides in the PMT of the current MPEG-2 program. This bit shall be set to '1' when the matching association_tag resides in a DSM-CC Resource Descriptor within the Network Resources Table of this Data Service.

A tap_id field (16-bit) shall be used by the application to identify the data elements. The value of tap_id is scoped by the value of the app_id_byte fields associated with the Tap ( ) in the DST. The tap_id field is unique within an application. The tap_id value is selected by the data service provider at authoring time. It is used in the application as a handle to the data element.

A use field (16-bit) is used to characterize the communication channel referenced by the association_tag.

An association_tag field (16-bit) shall uniquely identify either a data elementary stream listed in the PMT or a DSM-CC Resource Descriptor listed in the Network Resource Table. In the former case, the value of this field shall be matched with the association_tag value of an association_tag_descriptor in the PMT of the data service.

A selector( ) field shall specify a particular data element available in a data elementary stream or a communication channel referenced by the association_tag field. In addition, the selector structure may indicate the protocol required for acquiring this data element.

A tap_info_length field (16-bit) shall specify the number of bytes of the descriptors following the tap_info_length field.

A descriptor( ) field shall follow the descriptor format.

An app_info_length field (8-bit) shall specify the number of bytes of the descriptors following the app_info_length field.

Another descriptor( ) field shall follow the descriptor format.

An app_data_length field (16-bit) shall specify the length in bytes of the following app_data_byte fields.

An app_data_byte field (8-bit) shall represent one byte of the input parameters and other private data fields associated with the application.

A service_info_length (8-bit) shall specify the number of bytes of the descriptors following the service_info_length field.

Another descriptor( ) field shall follow the descriptor format.

A service_private_data_length field (16-bit) shall specify the length in bytes of the private fields to follow.

A service_private_data_byte field (8-bit) shall represent one byte of the private field.

Figure 9:
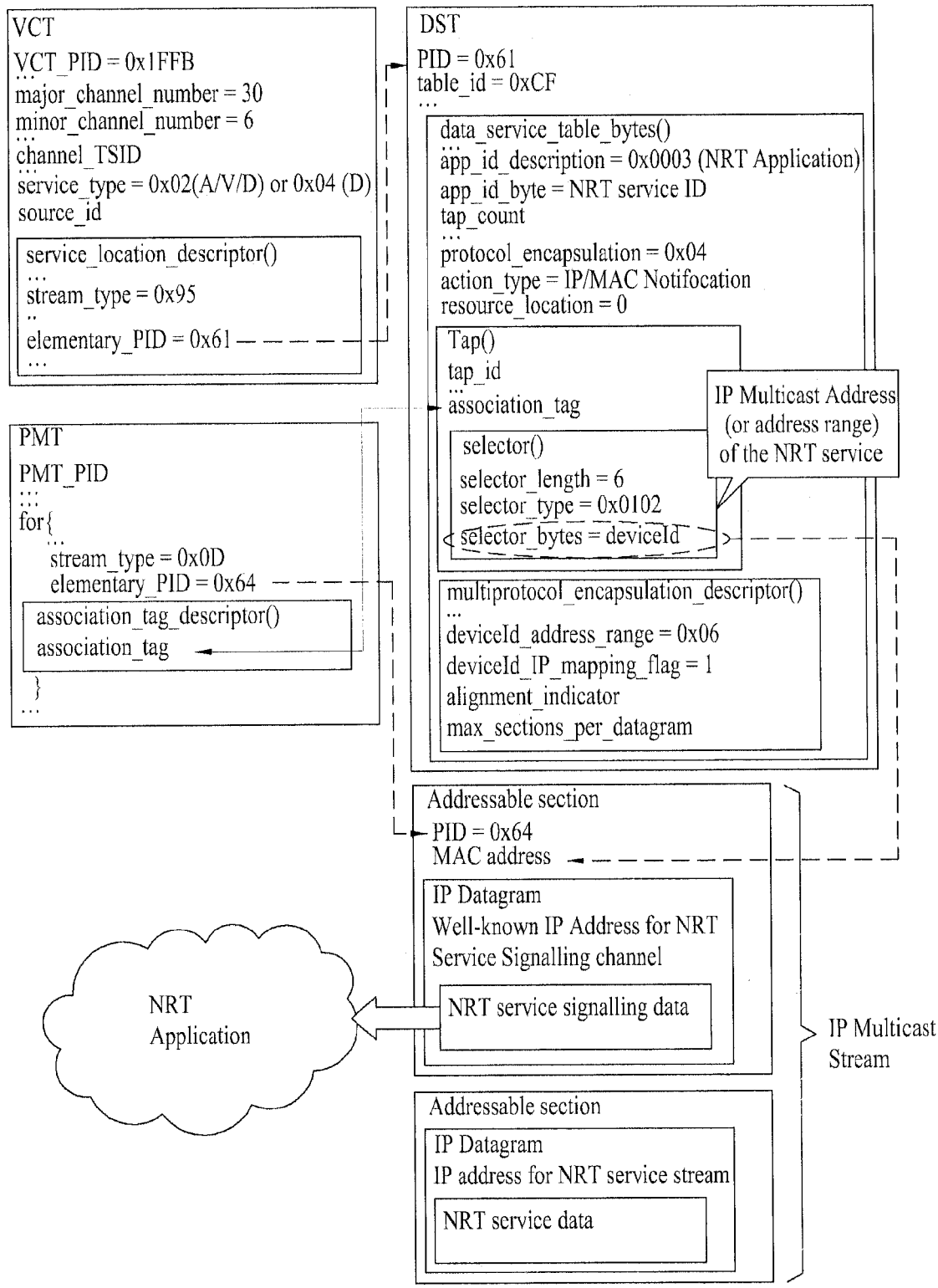
FIG. 9 illustrates an operation for acquiring connection information about an Internet Protocol (IP) stream that carries an NRT service signaling channel using Program Specific Information/Program and System Information Protocol (PSI/PSIP) tables according to an exemplary embodiment of the present invention.

FIG. 9 illustrates a method in which an NRT service is received and provided using an ATSC A/90 standard for carrying (or transmitting) a data broadcast stream and an ATSC A/92 standard for transmitting an IP multicast stream in a receiving system according to the present invention.

Namely, information of a stream that constitutes each virtual channel is signaled in an ES_loop of a PMT or a service location descriptor of a VCT. For example, an NRT service stream can be transmitted through the virtual channel in the case where the service type of the VCT is 0x02 (i.e., digital A/V Data), 0x04 (i.e., data only), or 0x08 (i.e., NRT only service), as shown in FIG. 6 or FIG. 7. At this time, when the stream_type field included in the service location descriptor (or the ES loop of the PMT) has a value allocated 0x95 (i.e., DST transmission), this indicates that a data broadcast is transmitted. A normal A/V is transmitted if the service location descriptor has no value for stream_type field or does not have a value of 0x95 allocated. Therefore, if the stream_type field included in the service location descriptor has a value of 0x95, the Elementary_PID field value is a PID of a Data Service Table (DST). Thus, the DST can be received through the Elementary_PID field.

The type of the application and details of a data broadcast stream transmitted through this channel can be determined through the DST. In the present invention, an NRT application (i.e., an NRT service) is identified using the DST.

That is, an App_id_description field of the DST specifies the format and analysis of application identification bytes subsequent to this field. In an embodiment of the present invention, '0x0003' is allocated to the App_id_description field in order to identify the NRT application.

If the App_id_description field value is '0x0003', an Application_id_byte value subsequent to this field is a service ID of the NRT application. A service ID of the NRT application may have a URI value that globally and uniquely identifies the corresponding service.

After the NRT application is identified as described above, a PID of an MPEG-2 TS packet separated from the IP datagram of the NRT service signaling channel is located through the Tap information. Then, an IP datagram that carries the NRT service signaling channel can be obtained from MPEG-2 TS packets having the PID found through the tap information and NRT service signaling data can be obtained from the obtained IP datagram. Here, well-known IP access information, i.e., a well-known IP address and a well-known UDP port number can be used as the IP access information of the NRT service signaling channel.

That is, an asynchronous IP stream is transmitted if a Protocol_encapsulation field value in the DST is 0x04 and a device_id value indicating the destination address is transmitted through a selector_bytes value if a Selector_type field value is 0x0102. A multiprotocol_encapsulation_descriptor is used in order to accurately analyze the selector_bytes value and signals the number of valid bytes included in the device_id value. As a result, an IP multicast address (or address range) of the NRT service signaling channel transmitted through the PID can be determined through the Tap information.

Accordingly, the IP multicast address (or address range) is accessed and an IP stream, i.e., an IP packet, is received and NRT service signaling information is extracted from the received IP packet.

NRT service data, i.e., NRT content/files, is received based on the extracted NRT service signaling information and the received data can be stored in a storage medium or can be displayed on a display.

In an embodiment, IP datagrams of the NRT service signaling channel which transmits the NRT service signaling information has the same well-known IP address and well-known UDP port number. Therefore, the determination of NST and NRT-IT included in the NRT service signaling information is done through table identifier. Thus, the table identifier can be the table_id of the corresponding table or the header of the table section, and when necessary, table_id_extension can be referred to in order to identify the table.

NRT Service Map Table (NST)

The NST provides access information of IP based NRT services included in the virtual channel. For example, the NST provides access information of each FLUTE sessions that configures one NRT service.

Here, whether one NST is configured with one session or plurality of sessions is determined through the table_id field, section_number field, last_section_number field, and the like. And the table may be completed by removing the IP header and the UDP header of the IP datagrams of the NRT service signaling channel and gathering sections having the same table identifier. For example, by gathering the sections having table identifier allocated for NST, the NST is completed.

FIG. 10 and FIG. 11 are diagrams for a bit-stream syntax of the NST configured according to one embodiment of the present invention.

In this case, although a corresponding syntax is written as an MPEG-2 private section to help the understanding, a format of corresponding data can have any type. For instance, session description protocol (SDP) is used to perform signaling via session announcement protocol (SAP).

Referring to FIG. 10 and FIG. 11, a table_id field is an 8-bit unsigned integer number that indicates the type of table section being defined in NST.

A section_syntax_indicator field is a 1-bit field that shall be set to '0' to always indicate that this table is derived from the "short" form of the MPEG-2 private section table.

A private_indicator field (1-bit) indicates whether the type of the corresponding section follows the private section type or not.

A section_length field is a 12-bit field. It specifies the number of remaining bytes this table section immediately following this field.

A table_id_extension field is a 16-bit field and is table-dependent. It shall be considered to be logically part of the table_id field providing the scope for the remaining fields. The table_id_extension field includes NST_protocol_version field.

The NST_protocol_version field is an 8-bit unsigned integer field whose function is to allow this NST to carry parameters that may be structured differently than those defined in the current protocol.

A version_number field (5-bit) indicates the version number of the NST.

A current_next_indicator field is a one-bit indicator, and indicates whether the NST sent is currently applicable.

A section_number field is an 8-bit field that shall give the section number of this NST section.

A last_section_number field is an 8-bit field that shall give the number of the last section.

A num_NRT_services field is an 8-bit field that specifies the number of NRT services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_id field is a 16-bit unsigned integer number that shall uniquely identify this NRT service within the scope of this NRT section. The NRT_service_id field of a service shall not change throughout the life of the service. To avoid confusion, it is recommended that if a service is terminated, then the NRT_service_id field for the service should not be used for another service until after a suitable interval of time has elapsed.

An NRT_service_status field is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

An SP_indicator field (1-bit) indicates whether or not service protection is applied to the corresponding NRT service. If the SP_indicator field value is 1, service protection is applied to at least one of the components that are required to provide meaningful presentation of the corresponding NRT service.

A short_NRT_service name length filed (3-bit) indicates the number of byte pairs in the short NRT_service_name field.

A short_NRT_service_name field (16*m) is a short name of the NRT Service. When there is no short name of this NRT Service, this field shall be filled with NULLs ('0x00').

An NRT_service_category field (6-bit) indicates a service type of the corresponding NRT service.

A num_components field (5-bit) specifies the number of IP stream components in this NRT Service.

An IP_version_flag field is a 1-bit indicator, which when set to '0' shall indicate that source_IP_address, NRT_service_destination_IP_address, and component_destination_IP_address fields are IPv4 addresses. The value of 1 for this field is reserved for possible future indication that source_IP_address, NRT_service_destination IP_address, and component_destination_IP_address fields are for IPv6.

A source_IP_address_flag field is a 1-bit Boolean flag that shall indicate, when set, that a source IP address value for this NRT Service is present to indicate a source specific multicast.

An NRT_service_destination_IP_address_flag field is a 1-bit Boolean flag that indicates, when set to '1', that an NRT_service_destination_IP_address value is present, to serve as the default IP address for the components of this NRT Service).

A source_IP_address field (32 or 128-bit) shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field (32 or 128-bit) shall be present if the NRT_service_destination_IP_address_flag is set to '1' and shall not be present if the NRT_service_destination_IP_address_flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined. The NRT_service_destination_IP_address is signaled when destination IP address of session level of this FLUTE session presents.

Thereafter, the 'for' loop, which is also referred to as a "component loop", is executed the same number of times as the number of components corresponding to the num_components field value to provide access information of a plurality of components. That is, access information of each of the components included in the NRT service is provided. Here, it is possible to provide the following field information for each FLUTE session. Furthermore, one component corresponds to one FLUTE session according to an embodiment of the present invention.

An essential_component_indicator field (1-bit) is an indicator which, when set to '1', shall indicate that this component is an essential component for the NRT Service. Otherwise, this field indicates that this component is an optional component.

A port_num_count field (6-bit) shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field (32 or 128-bit) shall be present if the component_destination_IP_address_flag is set to '1' and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num field (16-bit) represents the destination UDP port number for this UDP/IP stream component.

A num_component_level_descriptors field (4-bit) indicates the number of descriptors included in the component loop.

The same number of component_level_descriptors( ) as a number corresponding to the num_component_level_descriptors field value are included in the component loop to provide additional information about the component.

A num_NRT_service_level_descriptors field (4-bit) indicates the number of descriptors (NRT_service_level_descriptors( )) included in the NRT service loop.

The same number of NRT_service_level_descriptors( ) as a number corresponding to the num_NRT_service_level_descriptors field value are included in the NRT service loop to provide additional information about the NRT service.

A num_virtual_channel_level_descriptors field (4-bit) indicates the number of descriptors (virtual_channel_level_descriptors( )) providing additional information of the virtual channel.

The same number of virtual_channel_level_descriptors( ) as a number corresponding to the num_virtual_channel_level_descriptors field value are included in the virtual channel loop to provide additional information about the virtual channel.

FIG. 12 illustrates an embodiment of a bitstream syntax structure of a component_level_descriptors( ). The component_descriptor( ) is used as one of the component level_descriptor component_level_descriptors( ) of the NST and describes additional signaling information of the corresponding component.

The following is a description of each field of the component_descriptor( ).

In FIG. 12, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by IANA for the payload type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component.

A component_encryption_flag field (1-bit) informs whether the corresponding component is encrypted or not.

A Num_STKM_streams field (8-bit) indicates the number STKM streams if component_encryption_flag has been encrypted. (The num_STKM_streams field (8-bit) is an 8-bit unsigned integer field that shall identify the number of STKM streams associated with this component.

A STKM_stream_id field (8-bit) is repeated as much as the field value of Num_STKM_streams and indicates a value that identifies a STKM stream that can acquire a key required for decryption.

An NRT_component_data (component_type) element provides the encoding parameters and/or other parameters necessary for rendering this component. The structure of the component_data is determined by the value of component_type field.

For example, if the component_type field value is 35 then NRT_component_data (component_type) field provides component data for H.264/AVC video stream.

In another example, if the component_type field value is 38 then NRT_component_data (component_type) field provides data for FLUTE file delivery as shown in FIG. 13.

One NRT service can be included in multiple FLUTE sessions. Thus, one NRT service may be configured with plurality of FLUTE sessions. Each FLUTE session may be signaled using NRT_component_data( ) as shown in FIG. 13.

FIG. 13 illustrates an example of the bitstream syntax structure of NRT_component_data( ) that provides data for FLUTE file delivery according to the present invention. The following explains each field in the NRT_component_data( ).

A TSI field (16-bit) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIAS bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth.

An as_bandwidth field (16-bit) exists when the as_bandwidth_indicator field value is set to '1' and it indicates the maximum AS bandwidth.

A FEC_encoding_id field exits when the FEC_OTI_indicator field value is set to '1' and indicates FEC ID used in corresponding FLUTE session.

A FEC_instance_id field exists when the FEC_OTI_indicator field value is set to '1' and indicates FEC instance ID used in the corresponding FLUTE session.

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service is received. The FDT is used to transmit the list of all the content items, and also provides information necessary in acquiring content item and the files included in the content item.

NRT Information Table (NRT-IT)

FIGS. 14 and 15 are bit-stream syntax of an NRT-IT section according to an embodiment of the present invention.

The bit-stream syntax of the NRT-IT section is described in MPEG-2 Private section format for ease of understanding the bit-stream syntax of the NRT-IT section, but the format of the data can be in other formats as well. For example, signaling through Session Announcement Protocol (SAP) described by Session Description Protocol (SDP) type is also possible.

In the present invention, the NRT-IT in the NRT service signaling data includes information describing the downloadable content item needed to store the content item in the broadcast receiver.

Here, the determination whether one NRT-IT is configured through one section or plurality of sections can be known through the table_id field, section_number field, last_section_number field, and the like, within the NRT-IT section. And the table may be completed by removing the IP header and the UDP header of the IP datagrams of the NRT service signaling channel and gathering sections having the same table identifier. For example, by gathering the sections having table identifier allocated for NRT-IT, the NRT-IT is completed.

The detailed description of the NRT-IT section fields illustrated in FIGS. 14 and 15 are described below.

A Table_id field (8-bit) is set to 0xTBD to identify this table section as belonging to the Non-Real-Time Information Table.

An NRT_service_id field (16-bit) specifies the NRT_service_id field associated with the NRT service offering content items described in this section.

An NRT_IT_version_number field (5-bit) indicates the version number of this NRT-IT instance, where NRT-IT instance is defined as the set of one or more NRT_information_table_section( ) having common values for NRT_service_id field, current_next_indicator field, protocol_version field, and time_span_start field. The version number is incremented by 1 modulo 32 when any field in the NRT-IT instance changes.

A current_next_indicator (1-bit) field is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and time_span length field are set such that the specified time span does not overlap with any other NRT-IT instance in this IP subnet.

A num_items_in_section field (8-bit) indicates the number of content items described in this NRT-IT section.

The 'for' loop (also referred to as content item loop) is executed for number of content items corresponding to the field value of the num_items_in_section and provides signaling information about plurality of content items. Thus, the signaling information of the content item of each content item included in the NRT service corresponding to the NRT_service_id field value is indicated. The following describes the field in each content item that may provide the information.

A content_linkage field (32-bit) in the range 0x0001 to 0xFFFF specifies the identification number of the content (or content item) described. Value 0x0000 is not used. The content_linkage field performs two linkage functions: it links metadata in the NRT-IT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

An updates_available field (1-bit) indicates whether a corresponding content item is updated. For example, when the updates_available field is set to '0,' updates are not expected to be provided for the associated content item(s), and broadcast receivers are not expected to look for them. When the updates_available field is set to '1,' the content item is updated periodically.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content_descriptors_length field (12-bit) indicates the total length (in bytes) of the content_descriptor( ).

A content_descriptor( ) is separately applied to each content item.

A descriptors_length field (10-bit) indicates the total length (in bytes) of the descriptor ( ).

A descriptor( ) is commonly applied to all content items described in the current NRT-IT section.

According to the above description, NRT service signaling information is signaled on an NRT service signaling channel and RT service signaling information is signaled in PSI/PSIP tables in the present invention. An NRT service is downloaded at a predetermined time according to scheduling information signaled in an NRT-IT, whereas an RT service may be received immediately or at a predetermined future time according to scheduling information signaled in an EIT.

As stated before, the PSIP tables may include a VCT, an STT, an RRT, an ETT, a DCCT, a DCCSCT, an EIT, and an MGT.

Figure 16:
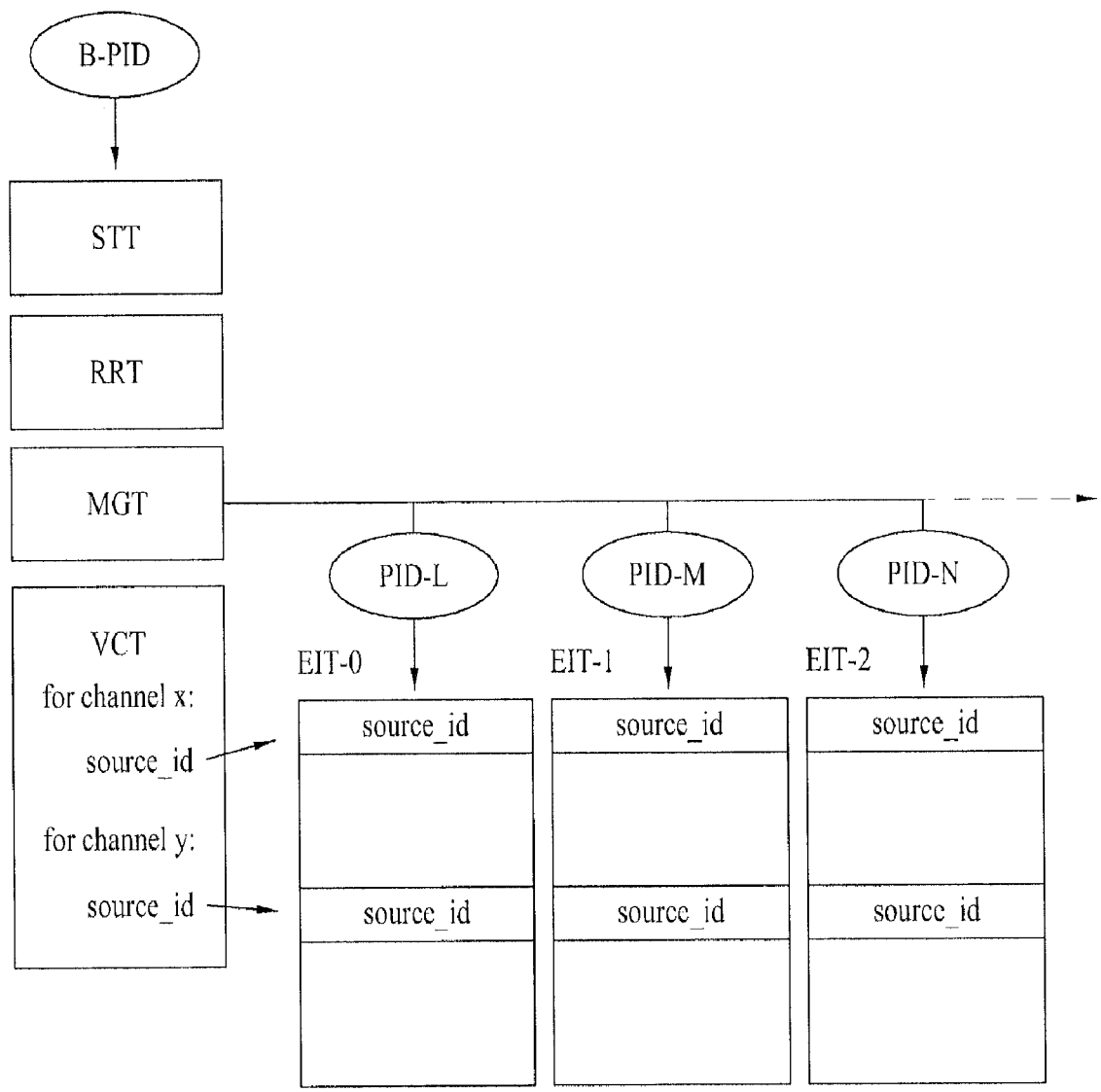
FIG. 16 illustrates a hierarchical relationship among PSIP tables.

FIG. 16 illustrates a hierarchical relationship of the PSIP tables.

To receive and interpret a multiplexed transport stream correctly, the broadcast receiver should collect packets with Base_PID(0x1FFB). Packets corresponding to Base_PID are STT, RRT, DCCT, DCCSCT, MGT, and VCT. Table_id of each table is preliminarily defined in the ATSC.

The MGT defines the PIDs and version numbers of other tables, for example, EITs and ETTs. The ETTs provide detailed information about channels and programs. The EITs provide event information about every program to be played on virtual channels listed in the VCT. That is, an EIT provides information about the title, start time, etc. of an event. One EIT covers information about three hours of an event. Accordingly, information about an event of some virtual channel may be provided in a plurality of EITs.

An event may mean a program unit. For instance, if there are Drama 1 and News 1, each of Drama 1 and News 1 is an event.

EITs are numbered EIT-0 to EIT-127 and each EIT-x specifies the title, start time, etc. of a non-overlapped three-hour event.

There are two types of ETTs, event ETT and channel ETT. Detailed information about each event is recorded in the event ETT, whereas detailed information about each virtual channel is recorded in the channel ETT.

Event ETTs are mapped to EITs. To be more specific, detailed information about events described by EIT-0 is recorded in ETT-0, detailed information about events described by EIT-1 is recorded in ETT-1, and detailed information about events described by EIT-127 is recorded in ETT-127.

The channel ETT is a table defined when extended channel infatuation is needed regarding n virtual channels included in one Radio Frequency (RF) channel or a physical channel.

Each of n virtual channels defined in the VCT uses source_id to identify its channel source. If one physical channel includes n virtual channels, each of the n virtual channels has source_id. Herein the virtual channels have different values of source_id.

The presence or absence of a channel ETT for each virtual channel is known from ETM_location defined in the VCT. The same thing applies to the event ETT.

A channel ETT and an event ETT each form one section. Each of the channel and event ETT sections provides ETM_id identifying an event or a virtual channel and an Extended Text Message (ETM) concerning the event or virtual channel. The ETM_id includes event_id of the event in case of an event ETT section and source_id of a channel source in case of a channel ETT section.

FIG. 17 illustrates the bit stream syntax structure of an EIT section according to an exemplary embodiment of the present invention. The EIT section has the following fields.

Referring to FIG. 17, a table_id field (8 bits) is the unique ID of a table, indicating that the table in this section is an EIT.

A section_syntax_indicator field (1 bit) is an indicator that defines the format of the EIT section.

A private_indicator field (1 bit) indicates whether the EIT section is a private section.

A section_length field (12 bits) specifies the length of the EIT section.

A source_id field (16 bits) provides the source ID of a virtual channel carrying events described in the EIT section. For example, EIT-x (x=0, 1, ..., 127) may be identified by a combination of table_id and source_id.

A version_number field (5 bits) indicates the version number of the EIT.

A current_next_indicator field (1 bit) indicates whether information included in the EIT section is applicable currently or in a future.

A section_number field (8 bits) indicates the number of the current EIT section.

A last_section_number field (8 bits) indicates the number of the last EIT section.

A protocol_version field (8 bits) indicates a protocol version that allows an EIT carrying parameters of a different structure from a structure defined in a current protocol.

A num_events_in_section field (8 bits) specifies the number of events described in the EIT section.

Then, scheduling information and title information about each event are provided by running as many 'for' loop (or event loop) as the number of events specified by num_events_in_section field. The following information may be provided for each event.

An event_id field (14 bits) provides an identifier for identifying a corresponding event.

A start_time field (32 bits) indicates the start time of the event.

An ETM_location field (2 bits) indicates whether there is an ETT having detailed information about the event. That is, ETM_location field specifies the presence and location of an ETM.

A length_in_seconds field (20 bits) indicates the duration of the event in seconds.

A title_length field (8 bits) indicates the length of the following title_text( ) field in bytes. If title_length field is set to 0, this means that there is not a title for the event.

A title_text( ) provides a title of the event in the format of a multiple string structure.

A descriptors_length field (12 bits) specifies the total length (in bytes) of descriptor( ) that follows.

A descriptor( ) provides additional information about the event by an event unit.

A CRC_32 field (32 bits) contains a 32-bit Cyclic Redundancy Check (CRC) value for use in error correction.

The broadcast receiver provides an additional service such as an Electronic Program Guide (EPG) using PSIP tables such as EITs, ETTs, etc. The EPG is configured based on information about time-scheduled programs played on each channel and the start times of the programs, as specified in EITs and ETTs. That is, the EPG service gives a program schedule describing programs played on each channel and their synopses.

In a real broadcasting system, one broadcast program may be closely associated with a past or future broadcast program, or with a medium other than broadcasting. Especially in case of a series of broadcast programs, a user may reserve or view a previous or future program of the series of broadcast programs. In an NRT service, a previous show of the broadcast program may be recorded by program reservation in Push Video On Demand (VOD). A VOD service of the previous show is also available over the Internet that enables interactive communication.

Accordingly, information explicitly indicating correlation between broadcast programs is provided in an exemplary embodiment of the present invention. In addition, another service associated with a broadcast program, for example, an NRT service or Web service may be explicitly indicated.

In the present invention, a plurality of associated broadcast programs are grouped into an event group and a plurality of associated event groups are grouped into a super group. Herein, the term "broadcast program" includes an NRT service or a Web service as well as a program described by an EIT.

Take, for example, Heroes Season 1 having 12 episodes and Heroes Season 2 having 12 episodes. Each episode may be provided as an RT service or an NRT service over a broadcasting network. Also, each episode may be provided as a Web service over the Internet.

The 12 episodes of Heroes Season 1 and the 12 episodes of Heroes Season 2 may be grouped into first and second event groups, respectively. The first and second event groups may be grouped into a super group. Thus, the super group 'Heroes' includes two event groups, Season 1 and Season 2. The event group of Season 1 includes 12 events, that is, Episode 1 to Episode 12 and the event group of Season 2 includes 12 events, that is, Episode 1 to Episode 12.

In other words, one event group includes a plurality of broadcast programs and one super group includes a plurality of event groups.

Information about an event group is referred to as event group information and information about a super group is referred to as super group information. In the present invention, the event group information and the super group information are collectively called group information.

The present invention is intended to signal the group information. For example, the group information may be signaled by adding a field or a descriptor to an existing table or in a newly defined table.

In an exemplary embodiment of the present invention, a new table is defined to signal group information. For the convenience' sake, the new table is referred to as an Event Group Table (EGT). Event group information about one event group or super group information about one super group may be signaled by the EGT. That is, the event group information and the super group information are not signaled simultaneously in one EGT.

Event Group Table (EGT)

FIG. 18 illustrates the bit stream syntax structure of an EGT section according to an exemplary embodiment of the present invention.

While the bit stream syntax structure of an EGT section is written in the format of an MPEG-2 private section to help understanding, the present invention is not limited to the specific data format.

It may be determined from table_id, section_number, and last section_number fields included in an EGT section whether one EGT includes one or more sections.

Referring to FIG. 18, the EGT section includes the following fields.

A table_id field (8 bits) uniquely identifies the table, indicating that this section is for an EGT.

The table_id of the EGT is preset. A PID of the EGT is defined in the MGT in an exemplary embodiment. Thus, a value identifying an EGT is allocated to table_type that identifies the types of tables in the MGT in the present invention.

FIGS. 19 and 20 illustrate values allocated to the table_type field and their meanings according to exemplary embodiments of the present invention.

The EGT is added as a table type in FIG. 19, and EGTs ranging from EGT0 to EGT255 are added as different table types in FIG. 20.

Referring to FIG. 19, group information delivered in an EGT has the same table type and the same PID in an exemplary embodiment. Each group may be identified by event_group_id in the EGT. In FIG. 19, 0x0006 is allocated as the table_type value of the EGT in an exemplary embodiment. As one table type is allocated to identify the EGT, the remaining area is available for a future use. Since group information uses the same PID and the same table type, the number of groups that may be used is limitless.

Referring to FIG. 20, group information about different groups delivered in an EGT has different table type values and uses different PIDs in an exemplary embodiment. In FIG. 20, table_type values are 0x1000 to 0x10FF for EGTs, EGT 0 to EGT 255. Advantageously, the presence or absence of a particular group may be determined beforehand from the table types of EGTs defined in the MGT without reading the group_id of an EGT to be received from event_group_descriptor of an EIT.

The values allocated to the table_type field and their meanings illustrated in FIGS. 19 and 20 are mere exemplary applications given for helping the understanding of the present invention. Since the table_type field may be readily changed to specify other tables by those skilled in the art, the present invention is not limited to the above exemplary embodiments.

Referring to FIG. 18 again, a section_syntax_indicator field (1 bit) defines the syntax of the EGT section.

A private_indicator field (1 bit) indicates whether the EGT section takes the format of the MPEG2 private section.

A section_length field (12 bits) specifies the length of the EGT section.

An event_group_id field (16 bits) identifies an event group or a super group. For instance, if the EGT signals event group information, this field is set to an identifier of an event group. If the EGT signals super group information, this field is set to an identifier of a super group.

A version_number field (5 bits) is the version number of the EGT. This field provides a modulo-32 value that increases by 1 each time the contents of the EGT section are updated.

A current_next_ndicator field (1 bit) indicates whether information included in the EGT section is applicable currently or in a future.

A section_number field (8 bits) specifies the number of the current EGT section.

A last_section_number field (8 bits) specifies the number of the last EGT section.

A protocol_version field (8 bits) indicates a protocol version that allows an EGT carrying parameters of a structure different from a structure defined in a current protocol. In an exemplary embodiment, the protocol_version field is always '0'.

A group_title_length field (8 bits) specifies the length of group_title_text( ) that follows. If this field is set to 0, this means that there is not a title for the event group or super group.

A group_title_text( ) indicates the title of the event group or the title of the super group in the format of a multiple string structure. For example, if the EGT signals event group information, this field indicates the title of the event group. If the EGT signals super group information, this field indicates the title of the super group.

A super_group field (1 bit) indicates whether the EGT signals event group information or super group information. For instance, if the super_group field is '1', the EGT signals super group information, and if the super_group field is '0', the EGT signals event group information in an exemplary embodiment.

A num_events_in_section field (8 bits) gives the number of events (i.e. broadcast programs) included in the EGT section. For example, if the EGT signals event group information, this field specifies the number of events. If the EGT signals super group information, this field specifies the number of event groups. Accordingly, the number of event groups included in the super group or the number of events in the event group may be known from the num_events in_section field. That is, the number of associated event groups or events is known.

Then information about the titles and links of a plurality of events or event groups is provided by running as many 'for' loop (referred to as event loop) as the number of events or event groups specified by the num_events_in_section field. For each event or event group, the following information may be provided.

A title_length field (8 bits) specifies the length of title_text( ) that follows in bytes. If the title_length field is 0, this implies that there is not a title for the event or event group.

A title_text( ) represents the title of the event or event group in a multiple string structure. For example, if the EGT signals event group information, the title_text( ) gives the title of the event and if the EGT signals super group information, the title_text( ) gives the title of the event group.

A num_links_in_event field (8 bits) specifies the number of links that can be connected to the event or event group. Link information about the event or event group is provided by running as many 'for' loop (referred to as link loop) as the number of links specified by the num_links_in_section field. For instance, a certain number of links may exist for the event or event group. If a plurality of links exists for the event or event group, the links are prioritized according to their accessibility levels or utilization levels and are accessed based on their priority levels. The event or event group may be provided as an RT or NRT service over the broadcasting network or as a Web service over the Internet. Also, the event or event group may be Audio/Video (A/V) signals of an actual broadcast program, or additional information about the broadcast program, such as a preview, a thumbnail, or a Web document. For each link, information may be provided in the following fields.

A link_type field (8 bits) indicates the type of the link, that is, the type of the event or event group.

FIG. 21 illustrates values available for the link_type field and the meanings of the values according to an exemplary embodiment of the present invention.

Referring to FIG. 21, if the link_type field is set to 0x00, this implies that the link is an event group. This link type is one of link types available when the EGT signals super group information.

If the link_type field is set to 0x01, the link is a HyperText Markup Language (HTML) portal. For example, the HTML portal may be any of a home page, bulletin board, etc. of the event or event group.

If the link_type field is set to 0x02, the link is a thumbnail.

If the link_type field is set to 0x03, the link is a preview.

If the link_type field is set to 0x04, the link is an actual broadcast program (typical A/V signals).

The values allocated as link types in the link_type field and their meanings are a mere exemplary application and thus it is to be understood that information may be added to or deleted from the link_type field readily by those skilled in the art. Hence, the present invention is not limited to the exemplary embodiment.

A link_media field (8 bits) indicates a path through which the link type indicated by the link_type field is accessible.

A link_length field (8 bits) specifies the length of the following link_byte field because links to be accessed may have different IDs according to media.

A link_byte (variable) provides an identifier of the link.

FIG. 22 is a table that defines values available for the link_media field, and values of the link_byte field that are determined according to the values of the link_media field according to an exemplary embodiment of the present invention.

Referring to FIG. 22, if the link_media field is set to 0x04, this implies that the EGT signals super group information. In this case, as many event groups as specified by the num_events_in_section field are included in event loop, instead of events. Thus, when the link_media field is 0x04, the link_byte field indicates an identifier (event_group_id) of the event group.

If the link_media field is set to 0x01, this means that the event or event group is a program listed in an EIT, provided as an RT service over the broadcasting network. In this case, the link_byte field provides ETM_id that includes source_id of an associated virtual channel. Therefore, a link specified by the link_type field may be received based on the source_id included in the ETM_id.

If the link_media field is set to 0x02, this implies that the event or event group is provided as an NRT service. In this case, the link_byte field indicates a service identifier (service_id) and a content identifier (content_id).

If the link_media field is set to 0x03, this implies that the event or event group is provided as a Web service. In this case, the link_byte field indicates an Internet Uniform Resource Locator (URL).

For example, on the assumption that an EGT signals event group information, two links are available for an event, Episode 1 of Heroes Season 1, one of the links is an actual broadcast program (i.e. typical A/V signals) provided as an RT service over a broadcasting network, and the other link is a preview provided as an NRT service over the broadcasting network, the num_links_in_event field is 2, the link_type field, the link_media field, and the link_byte field for the first link loop are 0x04, 0x01, and ETM_id, respectively, and the link_type field, the link_media field, and the link_byte field for the second link loop are 0x03, 0x02, and service_id and content_id, respectively.

If the link_type field is set to 0x00, which implies that the EGT signals super group information, the event_group_id field in the header of the EGT provides an identifier of a super group and the link_byte field represents an identifier of an event group.

The values allocated to the link_media field and their meanings illustrated in FIG. 22 are a mere exemplary application and thus it is to be understood that information may be added to or deleted from the link_media and link_byte fields readily by those skilled in the art. Hence, the present invention is not limited to the exemplary embodiment.

That is, additional information related to a program as well as the actual program may be signaled using link information in the present invention.

The additional information may include a preview (or trailer), a thumbnail, casting/director information, a music video, an original sound track, replay/next broadcasting schedules of programs included in a group of the program, an advertisement, etc. in relation to the program.

The link_media field specifies a path through which this additional information is accessible and the link_byte field provides an identifier that identifies the additional information.

Because it may take much time to download a large amount of additional information, the additional information is transmitted in an NRT service or Web service in an exemplary embodiment of the present invention.

In accordance with the present invention, a program or additional information may be available free of charge or may be charged. A pay program or pay additional information may be paid in advance or afterwards. For example, in case of pre-payment, a program or additional information is downloaded after the amount necessary to make a purchase is deposited in advance or a fee is paid by card or on-line transfer. On the other hand, in case of post-payment, a pay program or pay additional information is downloaded and then the service is billed along with other service charge or communication charge. That is, a payment process is required before a pay program or pay additional information is downloaded.

An event_descriptor_length field (8 bits) specifies the total length of the following event_descriptor in bytes.

An event_descriptor( ) provides additional information about the event or event group on an event or event group basis. If the EGT signals super group information, event_descriptor( ) provides additional information about an event group, and if the EGT signals event group information, event_descriptor( ) provides additional information about an event.

For example, a genre descriptor may be included as an event descriptor to thereby describe the genre of a program. In addition, a caption service descriptor or a content advisory descriptor may be included to thereby describe the rating or caption information of the program.

A group_descriptor_length field (8 bits) specifies the total length of the following group_descriptor in bytes.

A group_descriptor( ) provides additional information about a group (e.g. super group or event group) on a group basis. If the EGT signals super group information, group_descriptor( ) provides additional information about a super group, and if the EGT signals event group information, group_descriptor( ) provides additional information about an event group.

For example, a genre descriptor may be included as a group descriptor to thereby describe the genre of a group. In addition, a caption service descriptor or a content advisory descriptor may be included to thereby describe the rating or caption information of the group.

For example, if all programs of a group are identical in genre, a genre descriptor is included as the group descriptor and delivers genre information about the group. The resulting obviation of the need for describing the genre of each program included in the group by an EIT reduces the amount of transmitted information.

A CRC_32 field (32 bits) contains a 32-bit CRC for error correction.

In the mean time, at least one event signaled by an EIT, at least one NRT service signaled by an NST, or at least one content signaled by an NRT-IT may be included in a specific event group. Then the identifier of the event group to which the event, NRT service or content belongs is provided by adding a descriptor to a related loop in the EIT, the NST or the NRT-IT in an exemplary embodiment.

For example, if Event 1 belongs to an event group with an event group ID of 25, a descriptor is added to an event loop of an EIT that signals Event 1, signaling the event group ID, 25.

In another example, if Content 3 also belongs to the event group with the event group ID 25, a descriptor is added to a content loop of an NRT-IT signaling Content 3 and the event group ID, 25 is signaled by the descriptor. Event group information about Event 1 and Content 3 is signaled in an EGT having the event group ID, 25.

FIG. 23 illustrates a bit stream syntax structure of event_group_descriptor that may be included in at least one of an EIT, an NST, and an NRT-IT according to an exemplary embodiment of the present invention.

The event_group_descriptor has the following fields.

Referring to FIG. 23, a descriptor_tag field (8 bits) is a descriptor identifier that identifies the event_group_descriptor( ).

A descriptor_length field (8 bits) specifies the remaining length of the descriptor, from after the descriptor_length field to the end of this descriptor, in bytes.

An event group_id_field (16 bits) is an identifier that identifies a corresponding event group.

For example, if event_group_descriptor( ) is included in an event loop of an EIT that signals Event 1, the event_group_id identifies the event group of Event 1.

Figure 24:
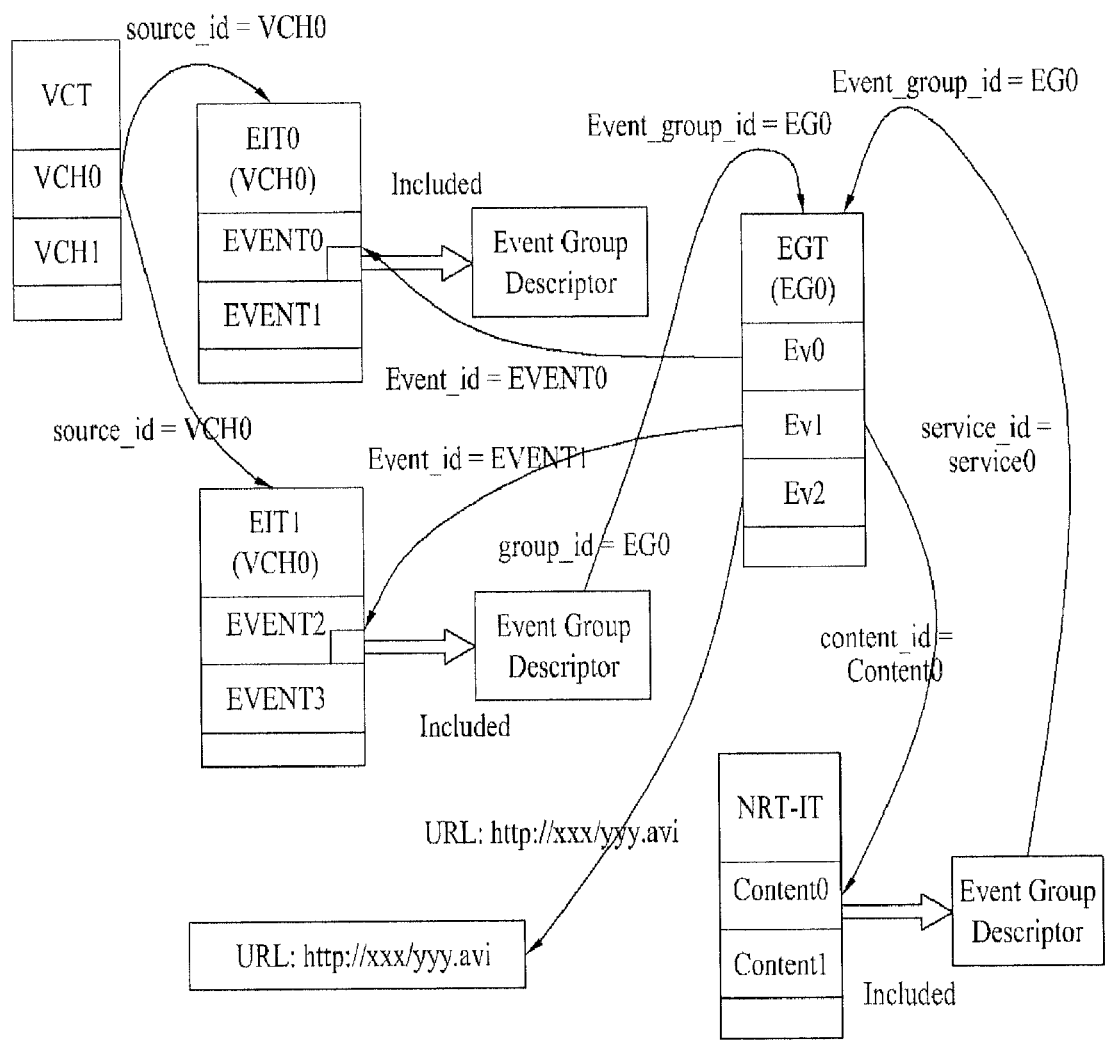
FIG. 24 illustrates a connection relationship among an EGT, an EIT, an NST, and an NRT-IT according to an exemplary embodiment of the present invention.

FIG. 24 illustrates a connection relationship among an EGT, an EIT, an NST, and an NRT-IT according to an exemplary embodiment of the present invention.

Referring to FIG. 24, a VCT signals information about two virtual channels of which the source identifiers (source_ids) are VCH0 and VCH1, respectively.

An EIT, EIT0 signals information about two events played on the virtual channel with source_id=VCH0. Event_ids of the two events are EVENT0 and EVENT1, respectively. event_group_descriptor having the configuration illustrated in FIG. 23 is included in an event loop with event_id=EVENT0 and event group identifier (event_group_id) is EG0 herein. Detailed text information about the events EVENT0 and EVENT1 may be obtained by parsing an ETT0 mapped to the EIT0.

Another EIT, EIT1 signals information about two events played on the virtual channel with source_id=VCH0. event_ids of the two events are EVENT2 and EVENT3, respectively. event_group_descriptor having the configuration illustrated in FIG. 23 is included in an event loop with event_id=EVENT2 and event_group_id is also EG0 herein. Detailed text information about the events EVENT2 and EVENT3 may be obtained by parsing an ETT1 mapped to the EIT1.

The broadcast receiver may be aware that the four events, EVENT0 to EVENT3 are received on the virtual channel with source_id=VCH0 by receiving the EIT0 and EIT1 with source_Id=VCH0. Also, the broadcast receiver may obtain scheduling information (i.e. broadcast times) about the four events EVENT0 to EVENT3. In addition, the broadcast receiver may determine that the events EVENT0 and EVENT2 belong to the event group with event_group_id=EG0.

An NRT-IT signals two contents included in an NRT service with serviceid=service0. One of the contents has content_id set to Content0 and the other content has content_id set to Content1. event_group_descriptor having the configuration illustrated in FIG. 23 is included in a content loop with content_id=Content0 and event_group_id is EG0 herein.

Therefore, the broadcast receiver may be aware that the event with event_id=EVENT0 in the EIT0, the event with eventid=EVENT2 in the EIT1, and the content with content_id=Content0 in the NRT-IT belong to the event group with event_group_id=EG0.

An EGT with event_group_id=EG0 includes three events Ev0, Ev1 and Ev2. It is assumed that the event Ev0 is related to the EVENT0 in the EIT0, the event Ev1 is related to the EVENT2 in the EIT1 or the Content0 in the NRT-IT, and the event Ev2 is downloadable over the Internet. It is also assumed that the event Ev0 is a broadcast program viewable by the EVENT0 on the virtual channel VCH0, the event Ev1 is a broadcast program viewable by at least one of the EVENT2 of the virtual channel VCH0 and the content0 of the NRT service, and the event Ev2 is a preview viewable by accessing an Internet URL, http://xxx/yyy.avi.

Then an EGT having the format illustrated in FIG. 18 has the event_group_id set to EG0, the super_group field set to 0, and the num_events_in_section field set to 3.

In the EGT, for the event Ev0, num_links_in_event field is 1, link_type field is 0x04, link_media field is 0x01, and link_byte field is ETM_id.

For the event Ev1, num_links_in_event field is 2, link_type, link_media, and link_byte fields of the first link loop are 0x04, 0x01, and ETM_id, respectively, and link_type, link_media, and link_byte fields of the second link loop are 0x04, 0x02, and service_id and content_id, respectively. The broadcast program corresponding to the event Ev1 may be provided as an RT or NRT service over the broadcasting network. If the broadcast program is received as an RT service, signaling information needed to receive and decode the broadcast program is included in PSI/PSIP tables. On the other hand, if the broadcast program is received as an NRT service, the signaling information is signaled by an NRT service signaling channel. Since the same broadcast program is available in both the RT and NRT services, the user may select one of the RT and NRT services for the broadcast program. Alternatively or additionally, the system prioritizes the RT and NRT services for the broadcast program and automatically selects one of the RT and NRT services according to their priority levels.

For the event Ev2, num_links_in_event field is 1, link_type field is 0x03, link_media field is 0x03, and link_byte field is set to an Internet URL.

For instance, if the user selects the broadcast program corresponding to the event Ev0 on an EPG screen created based on the EGT, the broadcast receiver may acquire information about the virtual channel carrying the broadcast program from the VCT according to source_id included in ETM_id set in link_byte field, and may acquire scheduling information about the broadcast program in the EIT0. Then the broadcast receiver receives the broadcast program at a preset time based on the virtual channel information and the scheduling information.

Figure 25:
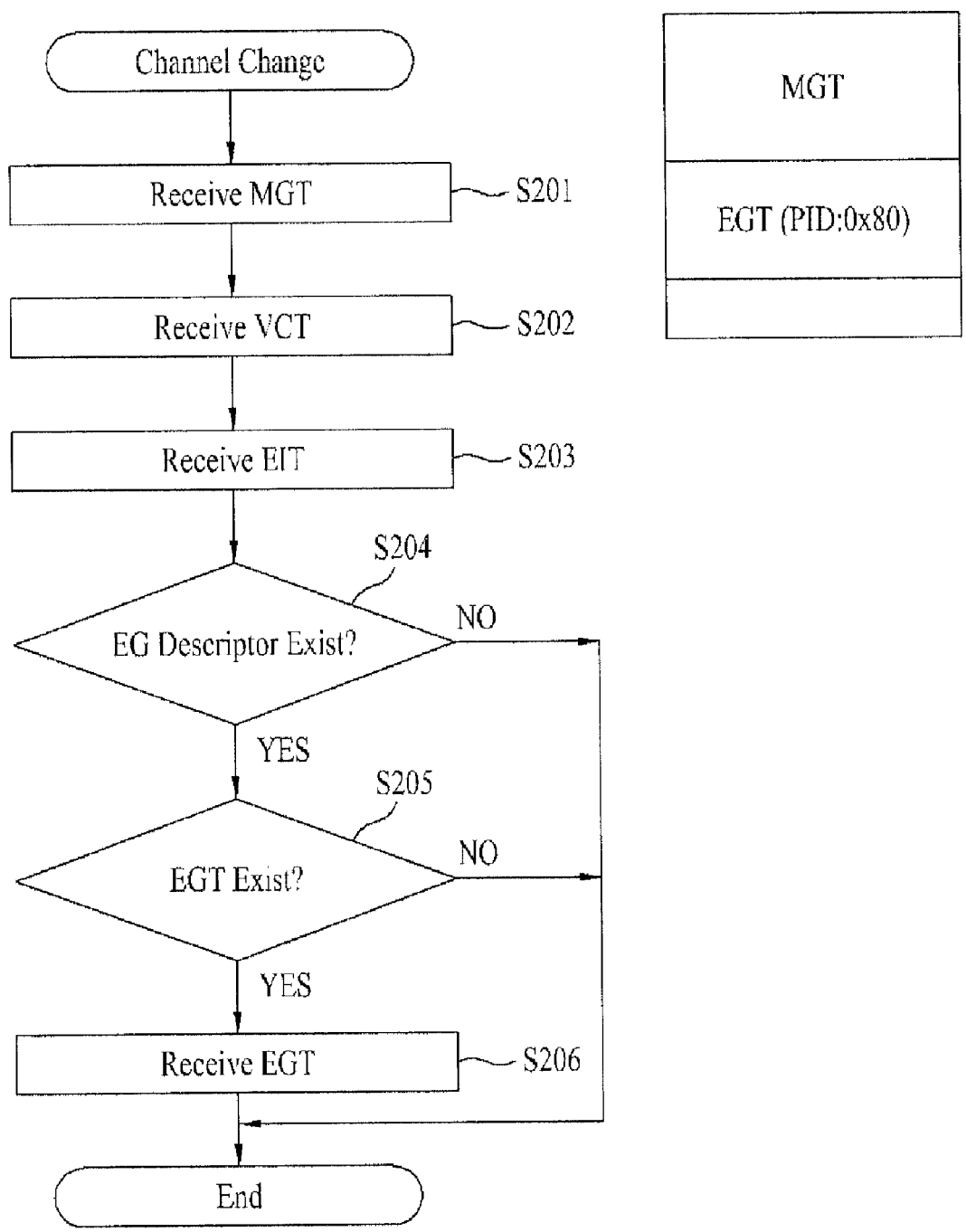
FIG. 25 is a flowchart illustrating a method for receiving an EGT in a broadcast receiver according to an exemplary embodiment of the present invention.

FIG. 25 is a flowchart illustrating a method for receiving an EGT in the broadcast receiver according to an exemplary embodiment of the present invention.

Referring to FIG. 25, upon power-on or channel switching, an MGT is extracted from a data stream received on a channel and the PIDs of a VCT and an EIT are detected from the MGT in step S201. The VCT is received in the data stream based on the PID and table_id of the VCT and virtual channel information including source_id is acquired from the VCT in step S202. In step 203, the EIT is received based on the source_id acquired from the VCT and the PID and table_id of the EIT.

It is determined whether the EIT includes event_group_descriptor in step S204. In the presence of event_group_descriptor, it is determined whether an EGT exists for the EIT in step S205.

In the example illustrated in FIG. 19, if table_type field is 0x0006 in the received MGT, that is, the MGT signals the PID of an EGT in step S201, it is determined that the EGT exists for the EIT in an exemplary embodiment. The PID of the EGT in the MGT is 0x80 in an exemplary embodiment.

In step S206, the EGT is received based on table_id of the EGT, the PID (=0x80) of the EGT acquired from the MGT, and event_group_id included in the EGT. That is, filtering conditions for receiving the EGT are the PID (=0x80), table_id, and event_group_id of the EGT.

Figure 26:
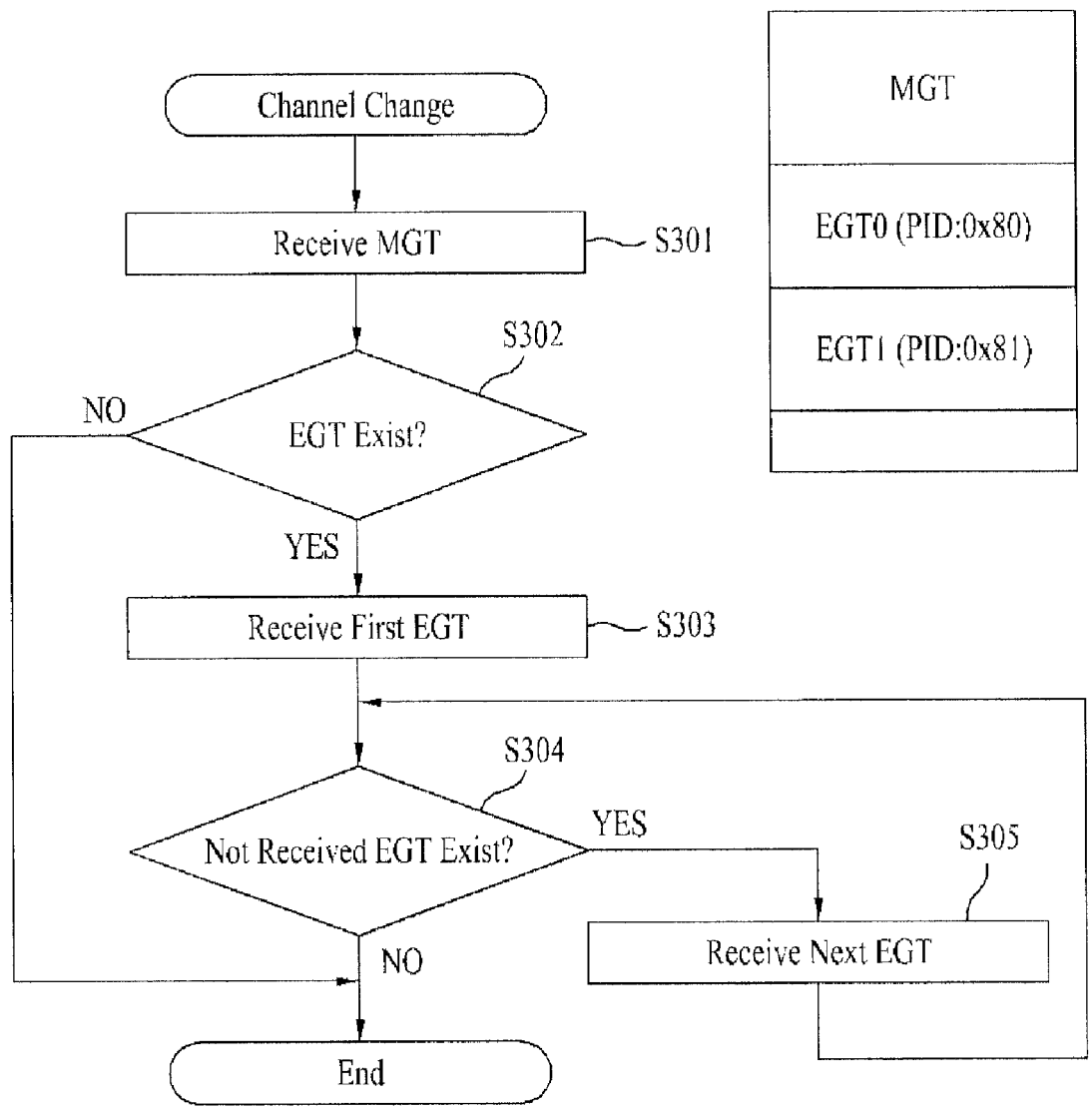
FIG. 26 is a flowchart illustrating a method for receiving an EGT in the broadcast receiver according to another exemplary embodiment of the present invention.

FIG. 26 is a flowchart illustrating a method for receiving an EGT in the broadcast receiver according to another exemplary embodiment of the present invention.

Upon power-on or channel switching, an MGT is extracted from a data stream received on a channel in step S301 and it is determined whether an EGT exists in step S302.

In the example of FIG. 20, if table_type is one of 0x1000 to 0x10FF in the MGT, that is, the MGT signals the PID of an EGT, it is determined that an EGT exists in an exemplary embodiment. The PIDs of EGT0 and EGT1 acquired from the MGT are 0x80 and 0x81, respectively in an exemplary embodiment.

In steps S303, S304 and S305, EGTs are received based on table ids of the EGTs and the PIDs of EGT0 to EGT255 acquired from the MGT. That is, 256 EGTs, EGT0 to EGT255 are allocated as table types in the MGT in FIG. 26. To receive an EGT, only the MGT suffices. EGTs are sequentially received, starting with the first EGT, referring to an EGT list described in the MGT. If the PIDs of EGTs are 0x80 and 0x81, a PID filtering condition for receiving a first EGT is PID=0x80 and a PID filtering condition for receiving a second EGT is PID=0x81.

Figure 27:
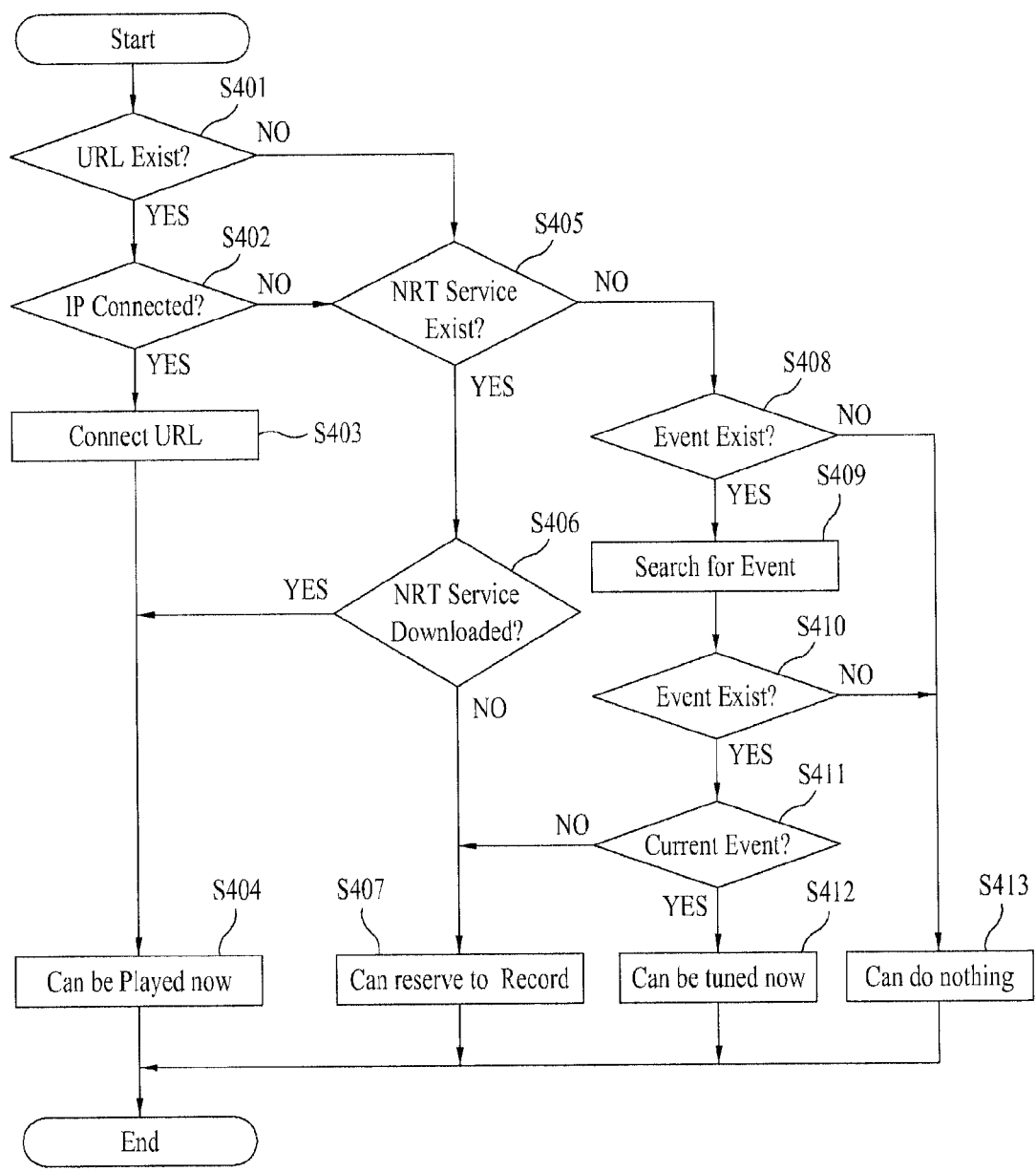
FIG. 27 is a flowchart illustrating a method for receiving an event listed in an EGT according to preset priority levels of links for the event according to an exemplary embodiment of the present invention.

FIG. 27 is a flowchart illustrating a method for, in the presence of an event with a plurality of links in an event group signaled by an EGT, receiving the event according to priority levels preset for the links according to an exemplary embodiment of the present invention. This operation applies when num_links_in_event field is 2 or more in the EGT or when an RT service, an NRT service, and a Web service are available for a specific event. In the illustrated case of FIG. 27, the Web service, the NRT service, and the RT service have higher priority levels in this order. The priority levels of the services are notified on the current screen in FIG. 27.

Referring to FIG. 27, it is determined whether a URL exists in step S401. The presence or absence of a URL may be determined from at least one of link_media, link_length, and link_byte fields.

In the presence of a URL, it is determined whether the broadcast receiver is Internet-enabled by checking an IP connection of the broadcast receiver in step S402.

If the broadcast receiver is Internet-enabled, a Web page at a URL acquired from link_byte field is accessed in step S403. A Web service provided in the Web page may be played immediately in step S404. For example, if link_type field is 0x03 indicating a preview, the preview is immediately played from the Web page.

On the contrary, in the absence of a URL in step S402, it is determined whether an NRT service exists in step S405. The presence or absence of an NRT service may be determined using at least one of link_media, link_length, and link_byte fields.

In the presence of an NRT service, it is determined whether the NRT service can be downloaded immediately by checking scheduling information about contents included in the NRT service of an NRT-IT in step S406.

If the NRT service can be downloaded immediately, the NRT service is downloaded in a FLUTE session. Access information about the FLUTE session may be acquired from an NST. In this case, the NRT service may be played immediately in step S404. For example, if link_type field is 0x03 indicating a preview, the preview is immediately played in the NRT service. On the other hand, if the NRT service cannot be downloaded immediately in step S406, the preview is downloaded at a preset time and stored in a storage medium, that is, recording of the preview is reserved in step S407.

In the absence of the NRT service in step S405, it is determined whether an event exists in step S408. The presence or absence of an event may be determined using at least one of link_media, link_length, and link_byte fields.

In the presence of an event, the event is identified from an EIT based on ETM_id set in link_byte field in step S409. When the event is detected in step S410, it is determined whether the event can be received currently, referring to start_time field in the EIT in step S411.

If the event is currently available, the event may be received immediately through a tuner in step S412. If the event is not available currently, the event is received at a preset time and stored in a storage medium, that is, recording of the event is reserved in step S407.

In the absence of the event in step S408, there is nothing that may be done currently in step S413.

That is, it may be determined whether an event (i.e. program) is to be downloaded over the Internet, recording of the program is to be reserved in an NRT service, the program can be viewed if it has been already recorded, or any of these operations is impossible due to an invalid link of the program, based on link information in an EGT. The attributes of the program determined in this manner may be displayed as a UI on the display. If any other factor such as video quality is an issue to be considered first of all, there may exist a different priority decision tree.

Figure 28:
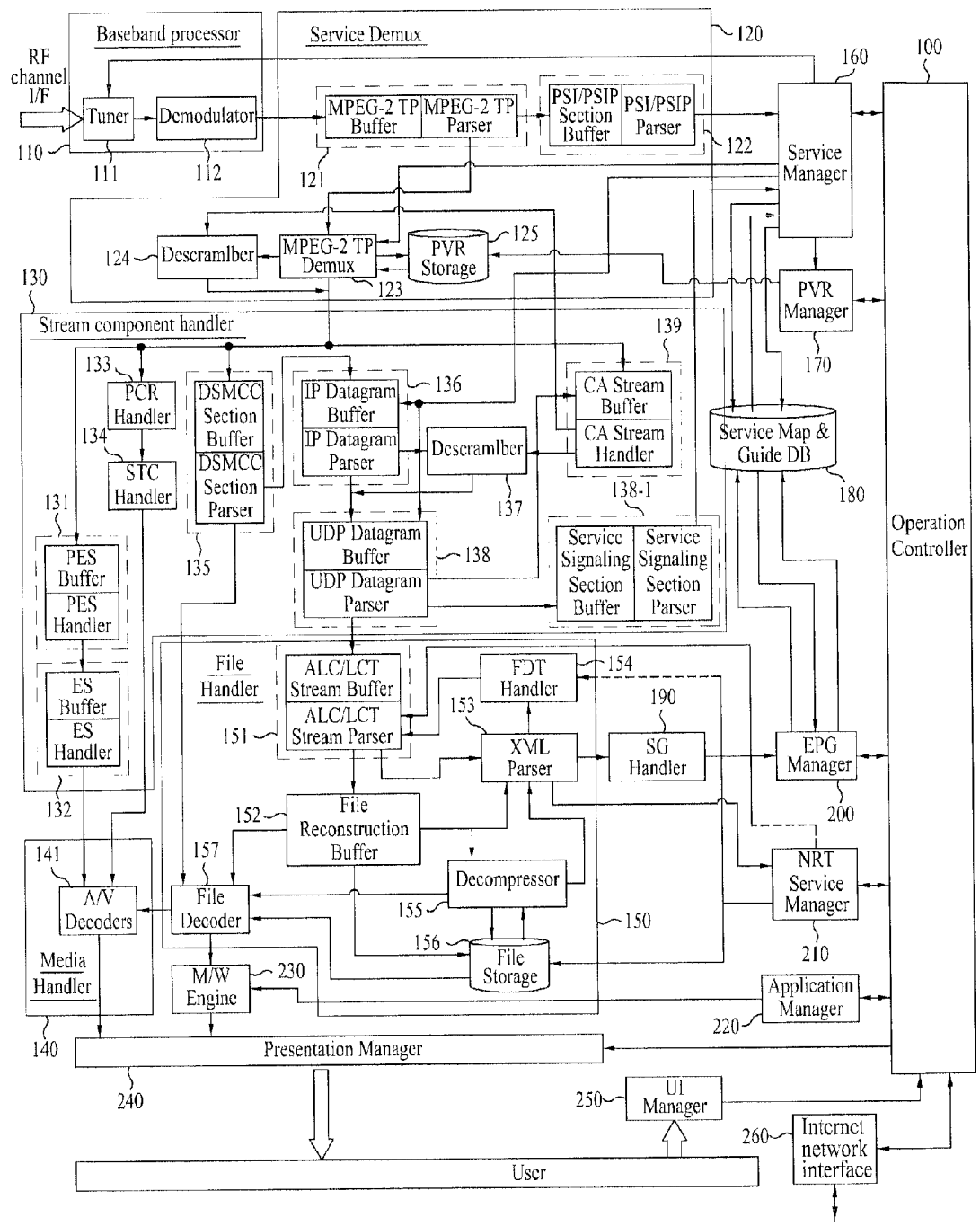
FIG. 28 is a block diagram of the broadcast receiver according to an exemplary embodiment of the present invention.

FIG. 28 is a block diagram of the broadcast receiver according to an exemplary embodiment of the present invention.

The broadcast receiver in FIG. 28 includes an operation controller 100, a baseband processor 110, a service demultiplexer 120, a stream component handler 130, a media handler 140, a file handler 150, a service manager 160, a PVR manager 170, a first storage unit (service map & guide DB) 180, an SG handler 190, an EPG manager 200, an NRT service manager 210, an application manager 220, a middleware engine 230, a presentation manager 240, a user interface (UI) manager 250, and an Internet network interface 260.

The baseband processor 110 includes a tuner 111 and a demodulator 112. The service demultiplexer 120 includes an MPEG-2 TP handler, a PSI/PSIP handler 122, an MPEG-2 TP demultiplexer 123, a descrambler 124 and a second storage unit (PVR Storage) 125.

The stream component handler 130 includes a packetized elementary stream (PES) decoder 131, an elementary stream (ES) decoder 132, a PCR handler 133, an STC handler 134, a DSM-CC addressable section handler 135, an IP datagram handler 136, a descrambler 137, a UDP handler 138, a service signaling section handler 138-1, and conditional access system (CAS) 139.

The media handler 140 includes A/V decoders 141. The file handler 150 includes an ALC/LCT stream handler 151, a file reconstruction buffer 152, an XML parser 153, an FDT handler 154, a decompressor 155, a third storage unit (file storage) 156, and a file decoder 157.

The tuner 111 for example in FIG. 28 detects signal transmitted over the terrestrial wave with the control from the service manager 160 and tunes only the wanted channel, down converts to Intermediate Frequency (IF), and outputs to the demodulator 112. The tuner 111 may receive both real time stream and non-real time stream. In the present invention, non-real time stream is referred to as NRT stream.

The demodulator 112 receives digital IF signal in a passband inputted from the tuner 111 and performs automatic gain control, carrier recovery and timing recovery to convert into baseband signal and performs channel equalization on the baseband signal. For example, if the broadcast signal is a VSB modulated signal, a VSB demodulation process is executed for automatic gain control, carrier recovery and timing recovery. In the demodulator 112, demodulated and equalized channel data is outputted to the MPEG-2 TP handler 121 in a MPEG-2 Transport Stream (TS) packet format.

The MPEG-2 TP (Transport Stream Packet) handler 121 includes an MPEG-2 TP buffer and an MPEG-2 TP parser and temporarily stores the output of the demodulator 112 and then analyzes a TS header and outputs the output of the demodulator 112 to the demultiplexer 123 if the output of the demodulator 112 is an RT A/V TS packet or an NRT TS packet and outputs the output of the demodulator 112 to the PSI/PSIP handler 122 if the output of the demodulator 112 is a TS packet for a PSI/PSIP table.

The PSI/PSIP handler 122 includes a PSI/PSIP section buffer and a PSI/PSIP parser. The PSI/PSIP handler 122 temporarily stores the TS packet output from the MPEG-2 TP handler 121 and restores and parses a corresponding table from PSI/PSIP section data included in a payload in the TS packet with reference to the table identifier or the like. Herein, whether one table includes one section or a plurality of sections can be determined through a table_id field, a section_number field, a last section_number field, or the like in the corresponding section. Then, the corresponding table can be completed by collecting sections having the same table identifier. For example, a VCT can be completed by collecting sections having a table identifier allocated to the VCT. Then, information of each parsed table is collected by the service manager 160 and is then stored in the first storage unit 180. Information of tables such as a MGT, a VCT, a PAT, a PMT, a DST, an EIT, an ETT, and an EGT according to the present invention is stored in the first storage unit 180 via the above procedure. The service manager 160 stores the table information in a service map and guide data format in the first storage unit 180.

The PSI/PSIP handler 122 and the service manager 160 receive, recover and parse an EGT according to the EGT reception method illustrated in FIG. 25 or FIG. 26. The parsed EGT information may be stored in the first storage unit 180, to use in an EPG. Information included in the EGT is illustrated in FIGS. 18 to 22 and thus its detailed description will not be provided herein.

Upon selection of a specific program in an EPG (or service guide) screen, the service manager 160 identifies the group of the selected program in an EIT and displays a group list with programs included in an EGT that signals information about the group. When needed, a super group list including event groups may also be displayed.

The demultiplexer 123 stores an RT A/V packet, which is received at one of the requests "temporary recording", "programmed recording", and "time shift", in the second storage unit 125. The second storage unit 125 is a large-capacity storage medium and may include, for example, an HDD. Downloading (storage) to and uploading (read or reproduction) from the second storage unit 125 are performed under control of the PVR manager 170.

At a reproduction request, the demultiplexer 123 separates an A/V TS packet uploaded from the second storage unit 125 into an audio TS packet and a video TS packet and outputs the TS packets to the PES decoder 131.

The demultiplexer 123 performs the above operations under control of the service manager 160 and/or the PVR (Personal Video Recorder) manager 170.

That is, if the service_type field value in the VCT indicates that an NRT service is carried, the service manager 160 extracts a PID of a DST from the service location descriptor (or the ES loop of the PMT) of the VCT and receives the DST.

Then, the service manager 160 identifies an NRT service from the received DST and extracts the PID of an MPEG-2 TS packet including the NRT service signaling channel using the DST and the PMT in order to receive the identified NRT service. The extracted PID is output to the demultiplexer 123. The demultiplexer 123 outputs MPEG-2 TS packets corresponding to the PID output from the service manager 160 to the addressable section handler 135.

The PCR is a time reference value that the A/V decoder 141 uses for audio ES and video ES time synchronization. The PCR handler 133 restores a PCR included in the payload of the received TS packet and outputs the PCR to the STC handler 134. The STC handler 134 restores a System Time Clock (STC), which is a reference clock of the system, from the PCR and outputs the STC to the A/V decoder 141.

The PES decoder 131 includes a PES buffer and a PES handler. The PES decoder 131 temporarily stores an audio TS packet and a video TS packet and then removes a TS header from each TS packet to restore an audio PES and a video PES. The restored audio PES and video PES are output to the ES decoder 132. The ES decoder 132 includes an ES buffer and an ES handler. The ES decoder 132 removes a PES header from each of the audio PES and the video PES and restores audio and video ESs which are pure data. The restored audio ES and video ES are output to the A/V decoder 141.

The A/V decoder 141 decodes the audio ES and the video ES using respective decoding algorithms to restore corresponding data prior to compression and then outputs the restored data to the presentation manager 240. Here, time synchronization is performed during decoding of the audio ES and the video ES according to the STC. For example, the audio decoding algorithm may use at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, a BSAC decoding algorithm, and the video decoding algorithm may use at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler. The CAS 139 temporarily stores the restored service protection data output from the CAS 139 or the TS packet output from the MPEG-2 TP handler 121 and then restores information required for descrambling (for example, a control word used for scrambling) from the stored TS packet or service protection data. That is, the CAS 139 extracts an Entitlement Management Message (EMM), Entitlement Control Message (ECM), and the like included in the payload of the TS packet and analyzes the extracted EMM and ECM to obtain information required for descrambling. The ECM may include a control word (CW) used for scrambling. Here, the control word may have been encrypted with an authentication key. The EMM may include an authentication key and certificate information of the corresponding data. The information required for descrambling obtained by the CAS 139 is output to the descramblers 124 and 137.

The DSM-CC section handler 135 includes a DSM-CC section buffer and a DSM-CC section parser. The DSM-CC section handler 135 temporarily stores the TS packet output from the demultiplexer 123 and restores an addressable section included in the payload of the TS packet and removes the header and CRC checksum of the addressable section to restore an IP datagram and outputs the IP datagram to the IP datagram handler 136. The IP datagram handler 136 includes an IP datagram buffer and an IP datagram parser. The IP datagram handler 136 buffers the IP datagram received from the DSM-CC section handler 135 and extracts and analyzes a header of the buffered IP datagram and restores a UDP datagram from the payload of the IP datagram and outputs the UDP datagram to the UDP datagram handler 138.

More specifically, when the IP datagram has been scrambled, the scrambled UDP datagram is descrambled by the descrambler 137 and the descrambled datagram is output to the UDP datagram handler 138. For example, the descrambler 137 receives information required for descrambling (for example, a control word used for scrambling) from the CAS 139 and performs descrambling upon the UDP datagram and then outputs the descrambled datagram to the UDP datagram handler 138.

The UDP datagram handler 138 includes a UDP datagram buffer and a UDP datagram parser. The UDP datagram handler 138 buffers the UDP datagram output from the IP datagram handler 136 or the descrambler 137 and extracts and analyzes a header of the buffered UDP datagram and restores data included in a payload of the UDP datagram. Here, the UDP datagram handler 138 outputs the restored data to the CAS 139 if the restored data is service protection data, outputs the restored data to the service signaling section handler 138-1 if the restored data is NRT service signaling data, and outputs the restored data to the ALC/LCT stream handler 151 if the restored data is NRT service data.

In an embodiment, access information of the IP datagram that carries the NRT service signaling channel includes a well-known destination IP address and a well-known destination UDP port number.

Accordingly, the IP datagram handler 136 and the UDP datagram handler 138 extract an IP multicast stream (i.e., NRT service signaling data), which has a well-known destination IP multicast address and a well-known destination UDP port number and carries an NRT service signaling channel, and outputs the extracted IP multicast stream to the service signaling section handler 138-1.

The service signaling section handler 138-1 is configured with a service signaling section buffer and a service signaling section parser. The service signaling section handler 138-1 recovers and parses the NST illustrated in FIG. 10 and FIG. 11, and the NRT-IT illustrated in FIG. 14 and FIG. 15 from the NRT service signaling data, outputs the NST and the NRT-IT to the service manager 160. By parsing the NST, it is possible to extract access information of a FLUTE session that carries the content/files of the NRT service. The parsed information from the NST and the NRT-IT is collected by the service manager 160 and then stored in the first storage unit 180. The service manager 160 stores the extracted information from the NST and the NRT-IT in the first storage unit 180 in the service map and service guide format. In another embodiment, the NRT service manager 210 can perform the task that the service manager 160 performs. Thus, the parsed information from the NST and the NRT-IT may be collected by the NRT service manager 210 and then stored in the first storage unit 180.

The ALC/LCT stream handler 151 includes an ALC/LCT stream buffer and an ALC/LCT stream parser. The ALC/LCT stream handler 151 buffers data having an ALC/LCT structure output from the UDP datagram handler 138 and then analyzes a header and a header extension of an ALC/LCT session from the buffered data. If the result of analysis of the header and header extension of the ALC/LCT session is that data transmitted in the ALC/LCT session has an XML structure, the ALC/LCT stream handler 151 outputs the data to the XML parser 153. If the result of analysis is that the data transmitted in the ALC/LCT session has a file structure, the ALC/LCT stream handler 151 temporarily stores the data in the file reconstruction buffer 152 and then outputs the data to the file decoder 157 or stores the data in the third storage unit 156. If the data transmitted in the ALC/LCT session is data for an NRT service, the ALC/LCT stream handler 151 is controlled by the NRT service manager 210. Here, if the data transmitted in the ALC/LCT session has been compressed, the data is decompressed by the decompressor 155 and the decompressed data is output to at least one of the XML parser 153, the file decoder 157, and the third storage unit 156.

The XML parser 153 analyzes XML data transmitted through the ALC/LCT session and outputs the analyzed XML data to the FDT handler 154 if the analyzed data is data for a file-based service and outputs the analyzed XML data to the SG handler 190 if the analyzed data is service guide data.

The FDT handler 154 analyzes and processes the file description table of the FLUTE protocol through the ALC/LCT session. The FDT handler 154 is controlled by the NRT service manager 210 if the received file is a file for an NRT service.

The SG handler 190 collects and analyzes data for a service guide transmitted in an XML structure and outputs the data to the EPG manager 200.

The file decoder 157 decodes a file output from the file reconstruction buffer 152, a file output from the decompressor 155, or a file uploaded from the third storage unit 156 using a preset algorithm and outputs the decoded file to the middleware engine 230 or outputs the decoded file to the A/V decoder 141.

The middleware engine 230 analyzes and executes the data having a file structure (i.e., application). The middleware engine 230 may then output the application to an output device such as a screen or speaker through the presentation manager 240. In an embodiment, the middleware engine 230 is a Java-based middleware engine.

The EPG manager 200 receives the service guide data from the SG handler 190 or the first storage unit 180 according to a user input, converts the received service guide data to a display format, and outputs the converted service guide data to the presentation manager 240.

More specifically, when the user requests an EPG screen through the UI manager 250, the EPG manager 200 configures an EPG including at least one of an RT service and an NRT service using information stored in the first storage 180 and/or service guide data of the SG handler 190 under the control of the operation controller 100. Then the EPG is displayed on the display according to a predetermined display format through the presentation manager 240.

Examples of an EPG screen and a UI that may be configured based on the EPG screen will be described later with reference to FIGS. 29 to 33.

The application manager 220 performs overall management associated with processing of the application data received in a file format or the like.

The service manager 160 collects and analyzes NRT service signaling data transmitted through an NRT service signaling channel or PSI/PSIP table data and creates a service map and then stores the map in the first storage unit 125. The service manager 160 controls access information of an NRT service desired by the user and controls the tuner 111, the demodulator 112, the IP datagram handler 136, etc.

The operation controller 100 controls at least one of the service manager 160, the PVR manager 170, the EPG manager 200, the NRT service manager 210, the application manager 220, and the presentation manager 240 according to a user command received through the UI manager 250 and pertains a function according to the user command.

The NRT service manager 210 performs overall management of the NRT service transmitted in a content/file(s) format through the FLUTE session in the IP layer.

The UI manager 250 transfers the user input to the operation controller 100 through a UI.

The presentation manager 240 provides at least one of the audio and video data output from the A/V decoder 141, the file data output from the middleware engine 230, and the service guide data output from the EPG manager 210 to the user through a speaker and/or screen.

The Internet network interface 260 accesses a Web server at a URL acquired from link_byte field, when link_type field is 0x01 in the EGT. Then the Internet network interface 260 provides a Web service received from the Web server to the user through the presentation manager 240.

FIGS. 29(a) and 29(b) illustrate an EPG screen and a UI screen that may be configured on the EPG screen according to an exemplary embodiment of the present invention.

FIG. 29(a) illustrates an exemplary EPG screen configured based on an EIT.

A program of a specific event group is labeled with a predetermined icon (symbol) to be distinguished from other programs that do not belong to the specific event group, on the EPG screen. Or programs of different event groups may be labeled with different icons or notified in different colors. In FIG. 29(a), Program3, Program4, and Heroes Season 1 [Episode 1] that have the same type of icons belong to at least one event group. Among them, Program4, and Heroes Season 1 [Episode 1] that are in the same color belong to the same event group.

FIG. 29(b) illustrates an exemplary UI screen in the case where when the user selects a specific program in the EPG screen illustrated in FIG. 29(a), an event group exists for the selected program and a super group exists for the event group.

In FIG. 29(b), the left box is an exemplary screen of a super group list and the right box is an exemplary screen of an event group list. Event groups of the super group are listed in the super group list, and events (i.e. programs) of one of the event groups in the super group are listed in the event group list.

To be more specific, the super group list includes the event group of the program selected from the EPG screen illustrated in FIG. 29(a) and the event group list includes the program selected from the EPG screen illustrated in FIG. 29(a).

A super group list and an event group list associated with a program, Heroes Season 1 [Episode 1] selected from the EPG screen illustrated in FIG. 29(a) are shown in FIG. 29(b).

The super group list may be acquired from an EGT that signals the super group. The EGT has super_group field set to V. That is, the title of the super group is known from group_title_text field, the number of event groups is determined based on num_events_in_section field, the title of each event group in the super group is obtained from title_text field in each of as many event loops as specified by num_events_in_section field, in the EGT of the super group.

The event group list may be acquired from an EGT signaling the event group. In the EGT, super_group field is '0'. That is, the title of the event group is known from group_title_text field, the number of events (programs) in the event group is determined based on num_events_in_section field, the title of each event in the event group is obtained from title_text field in each of as many event loops as specified by num_events_in_section field, in the EGT of the event group.

In the absence of an event group for the program selected from the EPG screen illustrated in FIG. 29(a), the UI screen of FIG. 29(b) is not displayed. In accordance with an exemplary embodiment of the present invention, when event_group_descriptor is included in an event loop corresponding to the selected program in the EIT, it is determined that there is an event group for the selected program.

In the absence of a super group for the event group, the super group list on the left side in FIG. 29(b) is not displayed. Instead, detailed text information about the program, as acquired from an ETT, may be displayed in the left box. That is, detailed text information about the program selected from the EPG screen illustrated in FIG. 29(a) is extracted from an ETT and displayed in the left box in FIG. 29(b). In an exemplary embodiment, the presence or absence of a super group for the event group is determined referring to the EGT of the event group of the selected program.

In another exemplary embodiment, when a program is selected from the EPG screen illustrated in FIG. 29(a), detailed text information about the super group including the selected program, detailed text information about the event group including the selected program, or detailed text information about the selected program may be displayed in place of the super group list in the left box of FIG. 29(b).

In the event group list in the right box of FIG. 29(b), a plurality of action buttons may be displayed beside each of the programs, so that the program is implemented in various manners. For the user to recognize the functions of the action buttons easily, the action buttons may take the form of icons. For instance, when the user selects a specific action button for a program, the program may be played instantly, recorded (downloaded), purchased, or transmitted.

For example,

▓ represents instant play. For convenience' sake, this action button is referred to as an instant play button.

▓ represents recording or downloading. For convenience' sake, this action button is referred to as a recording button.

▓ represents transmission. For convenience' sake, this action button is referred to as a send button.

▓ represents purchase. For convenience' sake, this action button is referred to as a purchase button.

▓ represents help concerning action buttons or execution results of the action buttons. For convenience' sake, this action button is referred to as a report button.

In the present invention, an action button for preview, an action button for replay scheduling, etc. may be added to each program.

The action buttons are mere exemplary applications designed for helping the understanding of the present invention. It is to be noted herein that addition and deletion of action buttons are readily realized by those skilled in the art and thus the present invention is not limited to the exemplary embodiment.

In an exemplary embodiment, each action button is activated for a program only if a function corresponding to the action button is available to the program. Even though the user selects an inactive action button, the function corresponding to the selected action button is not performed. That is, each program in the event group list has an attribute of viewable/reserved viewing available/reserved recording available/non-viewable according to its current status. According to the attribute of each program, each action button for the program is determined as active or inactive. The attribute of each program may be determined from an EIT, an NRT-IT, an NST, an EGT, etc. that describes signaling information of the program.

For example, on the assumption that a recording button is activated for Episode 2 in the event group list of Heroes Season 1, the user selects the recording button, and a current time is 10:00, December 22, Episode 2 is automatically recorded at the time of broadcasting Episode 2. If Episode 2 is provided in an RT service and start_time indicates 21:00, December 24 in the event loop of Episode 2 in an EIT, the service manager 160 controls the tuner 111 to receive Episode 2 of Heroes Season 1 at 21:00, December 24 and the PVR manager 170 stores the received Episode 2 in the second storage 125. In another example, if Episode 2 is provided in an NRT service and start_time indicates 21:00 December 24 in the content loop of Episode 2, the NRT service manager 210 downloads Episode 2 at 21:00 December 24 and stores it in the third storage 156 by controlling a FLUTE session.

When the user selects the title of a specific program in the event group list in FIG. 29(b), detailed text information about the selected program may be displayed in the left box.

Figure 29:
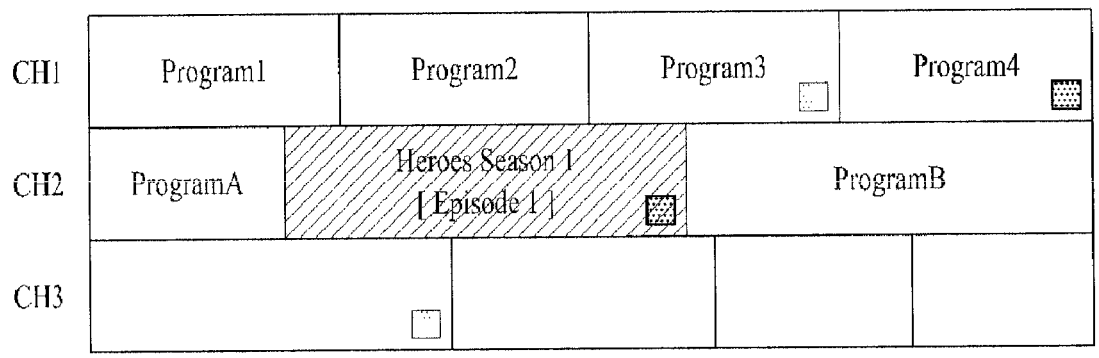
FIG. 29($a$) and FIG. 29($b$) illustrate an EPG screen and a User Interface (UI) screen that may be configured on the EPG screen according to an exemplary embodiment of the present invention.
Figure 30:
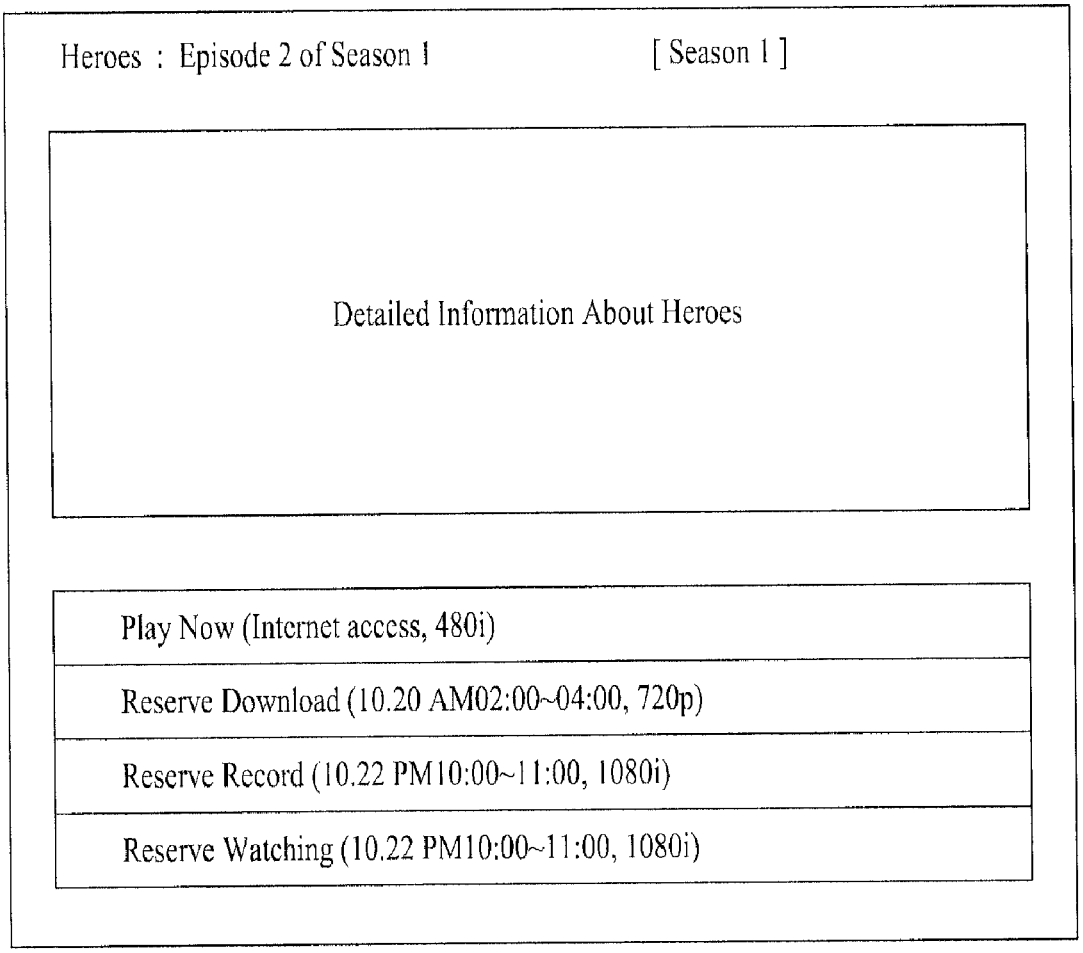
FIG. 30 illustrates a UI screen according to another exemplary embodiment of the present invention.

In another exemplary embodiment, when the user selects the title of a specific program in the event group list in FIG. 29(b), detailed text information and reception information about the selected program may be displayed in a separate screen as illustrated in FIG. 30. Or when the user selects a specific program in the EPG screen in FIG. 29(a), detailed text information and reception information about the selected program may be displayed in a separate screen as illustrated in FIG. 30. FIG. 30 illustrates an exemplary UI screen displayed when Episode 2 of Heroes Season 1 is selected.

In FIG. 30, Episode 2 of Heroes Season 1 may be received currently or in a future in three methods and four choices are given to the user. The reception time, attribute, etc. of Episode 2 of Heroes Season 1 may be acquired from link information in an EGT.

For example, a first item indicates that Episode 2 of Heroes Season 1 can be viewed currently over the Internet at 480i.

A second item indicates that Episode 2 of Heroes Season 1 can be downloaded at 720p for two hours starting from AM 2:00 October 20 in an NRT service.

A third item indicates that Episode 2 of Heroes Season 1 can be recorded at 1080i at a routine broadcasting time PM 10:00 October 22 for one hour.

A fourth item indicates that Episode 2 of Heroes Season 1 can be viewed at 1080i at a routine broadcasting time PM 10:00 October 22 for one hour.

For example, when the user selects Heroes Season 2 in FIG. 29(b), different programs are listed in the event group list as illustrated in FIG. 31. That is, the title of the event group list is changed to Season 2 and Episodes of Season 2 are displayed.

The subsequent process is performed in the same manner as in the case of Heroes Season 1 and its detailed description will not be provided herein.

If all programs included in an event group list cannot be displayed in a given screen, the programs are partially displayed in the present invention. Each program may be viewed by scrolling.

Figure 32:
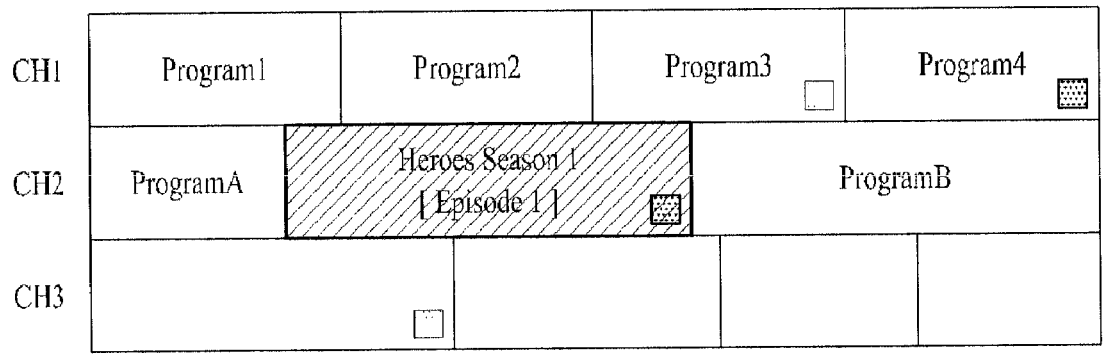
FIG. 32 illustrates an EPG screen and a UI screen that may be configured on the EPG screen according to another exemplary embodiment of the present invention.

FIG. 32 illustrates an EPG screen and a UI screen that may be configured on the EPG screen according to another exemplary embodiment of the present invention. When a highlighted program changes along with the movement of a cursor, the super group list and the event group list of the highlighted program are automatically displayed under the EPG screen.

Also in FIG. 32, a program of a specific event group is labeled with a predetermined icon (symbol) to be distinguished from other programs that do not belong to the specific event group, on the EPG screen. Or programs of different event groups may be labeled with different icons or notified in different colors.

In FIG. 32, a super group list screen is displayed in the left box and an event group list screen is displayed in the right box, under the EPG screen.

If there is not an event group for a program selected from the EPG screen, the event group list screen is not displayed. If event_group_descriptor is included in the event loop of the selected program in an EIT, it is determined that an event group exists for the selected program in an exemplary embodiment.

In the absence of a super group for the event group, the super group list screen is not displayed. Instead of the super group list, detailed text information about the program, acquired from an ETT may be displayed. Detailed text information about a highlighted program in the EPG screen may be extracted from an ETT and displayed in FIG. 32. In an exemplary embodiment, the presence or absence of a super group is determined using an EGT signaling the event group of the selected program.

In another exemplary embodiment, detailed text information about the super group or event group to which the highlighted program in the EPG screen belongs may be displayed.

When the user selects a specific event group in the super group list displayed in the left box under the EPG screen or the moving cursor changes a highlighted event group in FIG. 32, the event group list in the right box is replaced with the user-selected event group list or the highlighted event group list in an exemplary embodiment.

If the user selects the title of a specific program in the event group list, detailed text information and reception information about the selected program may be displayed in a separate screen as illustrated in FIG. 30. Or if the user selects a specific program in the EPG screen, detailed text information and reception information about the selected program may be displayed in a separate screen as illustrated in FIG. 30.

In the event group list in the right box of FIG. 32, a plurality of action buttons may be displayed beside each of the programs, so that the program is implemented in various manners. For the user to recognize the functions of the action buttons easily, the action buttons may take the form of icons.

The functions of the action buttons and implementation of a program by selecting each action button have been described before with reference to FIGS. 29, 30 and 31. Hence, their detailed description will not be provided herein.

Figure 33:
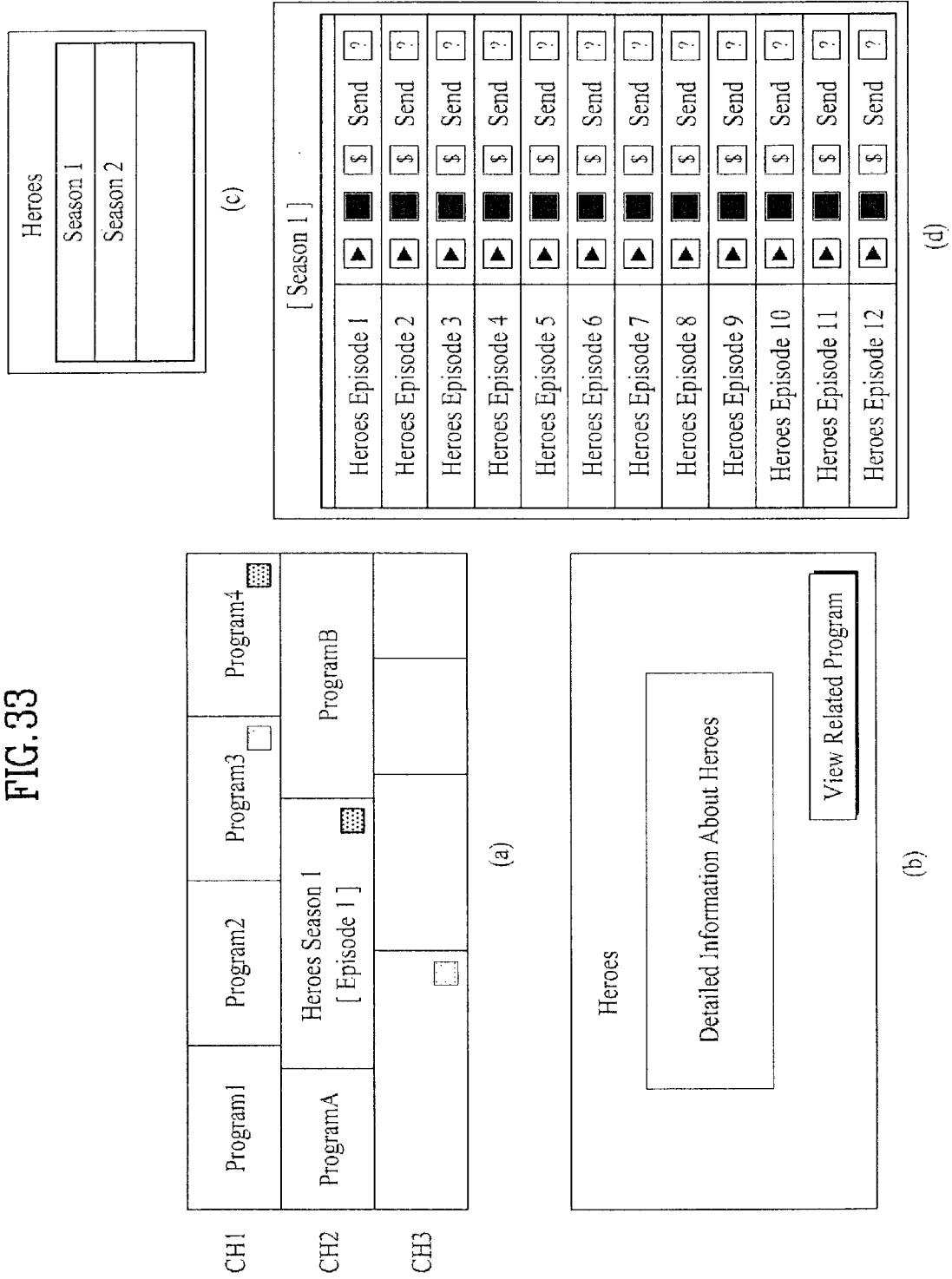
FIG. 33($a$) to FIG. 33($d$) illustrate an EPG screen and UI screens that may be configured on the EPG screen according to a further exemplary embodiment of the present invention.

FIGS. 33(*a*) to 33(*d*) illustrate an EPG screen and UI screens that may be configured on the EPG screen according to a further exemplary embodiment of the present invention. Referring to FIGS. 33(*a*) to 33(*d*), when a specific program is selected from an EPG screen, an action button is displayed to view other associated programs in a screen of detailed information about the selected program. Only when the action button is selected, a super group list or an event group list for the selected program is displayed. Herein, the action button is referred to as a "View Related Program" button.

The description of the EPG screen illustrated in FIG. 29(*a*) applies to FIG. 33(*a*).

FIG. 33(*b*) illustrates an exemplary screen that displays detailed information about a program selected from the EPG screen of FIG. 33(*a*). In an exemplary embodiment, the detailed information is extracted from an ETT. In FIG. 33(*b*), the "View Related Program" button is displayed in a portion of the detailed information screen.

Only when the selected program belongs to a specific event group, the "View Related Program" button is activated in an exemplary embodiment of the present invention.

When the user selects the "View Related Program" button which is active, a super group list or an event group list is displayed as illustrated in FIG. 33(*c*) or 33(*d*). Specifically, when a super group exists for the selected program, the super group list screen is displayed as illustrated in FIG. 33(*c*). In the absence of the super group, the event group list screen of FIG. 33(*d*) is displayed directly without displaying the super group list screen illustrated in FIG. 33(*c*).

If event_group_descriptor is included in the event loop of the selected program in an EIT, it is determined that an event group exists for the selected program in an exemplary embodiment. Also it is determined whether the super group exists for the event group of the selected program using an EGT signaling the event group in an exemplary embodiment.

When the user selects a specific event group in the super group list screen in FIG. 33(*c*), the event group list illustrated in FIG. 33(*d*) is replaced with the user-selected event group list in an exemplary embodiment.

The super group list and the event group list may be displayed in separate screens or in the same screen as illustrated in FIG. 29(*b*).

When the user selects the title of a specific program in the event group list, detailed text information and reception information about the selected program may be displayed in a separate screen, as illustrated in FIG. 30. Or when the user selects a specific program in an EPG screen, detailed text information and reception information about the selected program may be displayed in a separate screen, as illustrated in FIG. 30.

In the event group list in the right box under the EPG screen of FIG. 33(*a*), a plurality of action buttons may be displayed beside each of the programs, so that the program is implemented in various manners. For the user to recognize the functions of the action buttons easily, the action buttons may take the form of icons.

The functions of the action buttons and implementation of a program by selecting each action button have been described before with reference to FIGS. 29, 30 and 31. Hence, their detailed description will not be provided herein.

According to the present invention, among events of RT service, events of NRT service, and events of Web service through Internet, associated events are grouped and information about the group is signaled, thus providing a convenient use environment to a user. Also, a catch-up TV function is provided to service previous/next shows of an on-going series broadcast program using group information, and a plurality of links are provided for one program. Therefore, the user can access a program in various manners.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing program information in a broadcast receiver having a service manager, the method comprising:

selecting, by a user, a program from a service guide screen displayed on a display;

identifying, by the service manager of the broadcast receiver, a group to which the selected program belongs; and displaying, on the display, a group list of programs included in a signaling table that signals group information of the group identified by the service manager, wherein the signaling table is an Event Group Table (EGT), and wherein the EGT includes a same group identifier as included in an Event Information Table (EIT) that includes scheduling information of the selected program.

2. The method according to claim 1, wherein identifying a group comprises:

determining that the selected program belongs to a group corresponding to the group identifier.

3. The method according to claim 1, wherein the group identifier included in the EIT is included in a descriptor within an event loop applied to an individual event of the EIT.

4. The method according to claim 1, wherein the EGT further includes tide information of the identified group.

5. The method according to claim 1, wherein the EGT signals programs that belong to the group corresponding to the group identifier and each of the programs includes tide information and information about at least one link.

6. The method according to claim 5, wherein the information about the at least one link includes type information of the at least one link, path information of the at least one link, and an identifier of the at least one link.

7. The method according to claim 6, wherein when the path information of the at least one link indicates an EIT event, the identifier of the at least one link is an Extended Text Message (ETM) identifier.

8. The method according to claim 6, wherein when the path information of the at least one link indicates a non-real-time service, the identifier of the at least one link indicates a service identifier and a content identifier.

9. The method according to claim 6, wherein when the path information of the at least one link indicates a Web service, the identifier of the at least one link is an Internet Uniform Resource Locator (URL).

10. The method according to claim 6, wherein each of the programs in the group list has at least one of attributes being viewable, reserved viewing available, reserved recording available, and non-viewable based upon corresponding link information.

11. The method according to claim 1, wherein the signaling table includes indication information indicating whether the group information is information of an event group including one or more programs or information of a super group including one or more event groups.

12. The method according to claim 11, wherein when the indication information indicates the super group, a group identifier included in the signaling table is an identifier of the super group, the signaling table identifies event groups that belong to the super group corresponding to the group identifier, and each of the event groups includes title information and an identifier of corresponding event group.

13. A method for processing program information in a broadcast receiver, the method comprising:

displaying a service guide screen on a display;

selecting a program from the service guide screen;

displaying schedule information for downloading a program included in a group of the selected program or additional information of the selected program in a non-real time service; and downloading, by the broadcast receiver, the selected program or the additional information of the selected program according to the schedule information, wherein displaying the schedule information or the additional information is based on an Event Group Table (EGT) and an Event Information Table (EIT), the EGT including information of the group of the selected program, the EIT includes the scheduling information of at least the selected program or the additional information of the selected program, and wherein the EGT includes a same group identifier as included in the EIT.

14. The method according to claim 13, wherein the additional information includes at least one of a preview of the selected program, a thumbnail of the selected program, casting/director information of the selected program, a music video of the selected program, an original sound track of the selected program, replay or next broadcasting schedules of programs included in the group of the selected program, and an advertisement.

15. The method according to claim 13, further comprising displaying a group list of programs included in the EGT.

16. The method according to claim 15, wherein the programs included in the group list have at least one of attributes being viewable, reserved viewing available, reserved recording available, and non-viewable.

17. The method according to claim 13, wherein when the group of the selected program belongs to a super group, the method further comprises displaying a super group list of groups included in the super group.

18. The method according to claim 13, further comprising paying for the selected program or the additional information of the selected program before downloading the selected program or the additional information.

* * * * *